United States Patent
Sun et al.

(10) Patent No.: US 10,035,915 B2
(45) Date of Patent: Jul. 31, 2018

(54) LOW REFRACTIVE INDEX COATING FOR OPTICAL FIBERS, METHODS OF MANUFACTURE THEREOF AND ARTICLES COMPRISING THE SAME

(71) Applicant: OFS Fitel, LLC, Norcross, GA (US)

(72) Inventors: Xiaoguang Sun, West Hartford, CT (US); Debra A Simoff, Simsbury, CT (US); Andrei A Stolov, Simsbury, CT (US); Adam Hokansson, Granby, CT (US); Natalia Reyngold, Farmington, CT (US)

(73) Assignee: OFS FITEL, LLC, Norcross, GA (US)

(*) Notice: Subject to any disclaimer, the term of this patent is extended or adjusted under 35 U.S.C. 154(b) by 457 days.

(21) Appl. No.: 14/515,118

(22) Filed: Oct. 15, 2014

(65) Prior Publication Data

US 2016/0369103 A1     Dec. 22, 2016

(51) Int. Cl.

| | |
|---|---|
| *C09D 4/00* | (2006.01) |
| *C09D 5/00* | (2006.01) |
| *C08F 220/24* | (2006.01) |
| *C08F 220/22* | (2006.01) |
| *G02B 1/04* | (2006.01) |
| *G02B 6/02* | (2006.01) |
| *G02B 1/111* | (2015.01) |
| *C08K 5/5425* | (2006.01) |

(52) U.S. Cl.
CPC .............. *C09D 4/00* (2013.01); *C08F 220/22* (2013.01); *C08F 220/24* (2013.01); *C09D 5/00* (2013.01); *G02B 1/048* (2013.01); *G02B 1/111* (2013.01); *G02B 6/02033* (2013.01); *C08K 5/5425* (2013.01)

(58) Field of Classification Search
USPC ....................................................... 522/178
See application file for complete search history.

(56) References Cited

U.S. PATENT DOCUMENTS

| | | | |
|---|---|---|---|
| 4,511,209 A | 4/1985 | Skutnik | |
| 4,707,076 A | 11/1987 | Skutnik et al. | |
| 5,239,026 A * | 8/1993 | Babirad | C09D 4/00 252/182.18 |
| 5,690,863 A | 11/1997 | Schuman | |
| 5,756,209 A | 5/1998 | Hale | |
| 5,822,489 A | 10/1998 | Hale | |
| 6,249,638 B1 | 6/2001 | Hale | |
| 6,958,096 B2 | 10/2005 | Lindholm | |
| 7,847,028 B2 * | 12/2010 | Sugiyama | C08F 259/08 428/421 |

FOREIGN PATENT DOCUMENTS

WO      9304132      3/1993

OTHER PUBLICATIONS

Shore Durometer. Article from Wikipedia. pp. 1-6. Retrieved on Jan. 17, 2016. Retrieved from the internet. Retrieved from <URL:// https://en.wikipedia.org/wiki/Shore_durometer#cite_note-matweb-1>.*

Sun et al.; "Laser-induced damage to large core optical fiber by high peak power laser"; Proc. SPIE 8576, Optical Fibers and Sensors for Medical Diagnostics and Treatment Applications XIII, 857607; doi: 10.1117/12.2002394; (Mar. 20, 2013), 8 pages.

Xiaoguang Sun ; Jie Li ; Adam Hokansson; Study of optical fiber damage under tight bend with high optical power at 2140 nm. Proc. SPIE 6433, Optical Fibers and Sensors for Medical Diagnostics and Treatment Applications VII, 643309 (Feb. 15, 2007); doi:10.1117/12.699202.

Xiaoguang Sun ; Jie Li; Measurement of the temperature of bent fiber with high optical power at 2140 nm. Proc. SPIE 6852, Optical Fibers and Sensors for Medical Diagnostics and Treatment Applications VIII, 68520Q (Feb. 7, 2008); doi:10.1117/12.764216.

Xiaoguang Sun ; Jie Li ; Adam Hokansson ; Dan Whelan ; Michael Clancy; Study of laser-induced damage to large core silica fiber by Nd:YAG and Alexandrite lasers. Proc. SPIE 7173, Optical Fibers and Sensors for Medical Diagnostics and Treatment Applications IX, 71730E (Feb. 20, 2009); doi:10.1117/12.807758.

* cited by examiner

*Primary Examiner* — Sanza Mcclendon
(74) *Attorney, Agent, or Firm* — Cantor Colburn LLP; David E. Rodrigues, Esq.

(57) ABSTRACT

Disclosed herein is a composition comprising 65 to 95 weight percent of a fluorinated monofunctional monomer; 5 to 35 weight percent of a fluorinated multifunctional monomer; and 0.5 to 3 weight percent of a silane coupling agent; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or $CF$ moieties; and where a crosslinked composition has a shore D hardness of 56 to 85 and has a refractive index (RI) that meets the limitation of the equation $RI \leq 1.368 + 10.8/X$, where X denotes wavelength in nanometers.

23 Claims, 9 Drawing Sheets

LOW REFRACTIVE INDEX COATING FOR OPTICAL FIBERS, METHODS OF MANUFACTURE THEREOF AND ARTICLES COMPRISING THE SAME

CROSS-REFERENCE TO RELATED APPLICATIONS

This disclosure claims priority to U.S. Provisional Application No. 61/891,556 filed on Oct. 16, 2013 the entire contents of which are hereby incorporated by reference.

BACKGROUND

This disclosure is directed to an improved low refractive index coating for optical fibers, methods of manufacture thereof and to articles comprising the same. In particular, this disclosure relates to fluorinated low refractive index coatings for optical fibers that do not contain long-chain molecules with tri-fluorinated carbon atoms ($CF_3$) and that are devoid of the following types of fluorinated molecules:

$CF_3(CF_2)_n$—CH=$CH_2$;

$CF_3(CF_2)_n$—C(=O)—X where X is any chemical moiety;

$CF_3(CF_2)_m$—$CH_2$—X where X is any chemical moiety; where n>5 or m>6.

Fluorinated low refractive index coatings for optical fibers have previously been achieved using perfluorinated polyether (PFPE) oligomers. Principle examples are UV-curable derivatives of ethoxylated PFPE diols that are sold by Solvay under the tradenames FLUOROLINK® and FOMBLIN® and that have the following general structure:

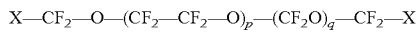

where the X end groups typically contain one or more —$CH_2$ bridging groups and as well as one or more alcohol (—OH) moieties that can be derivatized (e.g., to become acrylated). These PFPEs generally have relatively high number average molecular weights (on the order of 1500-2600 grams per mole) that are often leveraged to attain "high" viscosity and enable desirable convenient usage of conventional high-pressure optical fiber coating applicators. Desirably, PFPEs inherently have low refractive indices, but their use has certain disadvantages, chief amongst these being that PFPEs are themselves soft and do not impart hardness where hardness may be desirable. PFPE derivatives, e.g., PFPE (meth)acrylates or urethane (meth)acrylates, display low thermo-oxidative stability (after curing) in comparison with fluorocarbon materials that are not polyether based. In addition, PFPE oligomers can be more difficult to purify than lower molecular weight fluorinated monomers and some evidence suggests that hydrophilic impurities contribute to poor performance of PFPE-based claddings in humid environments. The term (meth)acrylate as used herein refers to either a methacrylate or to an acrylate.

PFPE derivatives, by virtue of their high molecular weight, are characterized by significant polydispersity; their molecular weight distribution can be difficult to control and reproduce when manufacturing successive lots. The polydispersity can in turn cause lot-to-lot variability in viscosity and in the compatibility with other coating components; such variability can reduce the consistency of fibers made using PFPE-based polymer claddings.

Other commercial polymer claddings have relied upon chemical components whose usage is being eliminated or severely restricted by chemical regulatory agencies (i.e., structures having similarity to perfluorinated octanoic acid—PFOA—as well as its precursors and higher homologues). PFOA has been found to be biopersistent and bioaccumulative. While not all components of the current invention have been tested for biopersistence and bioaccumulative propensity, it is a goal to not utilize components that are described by the US EPA's Long-Chain Perfluorinated Chemicals (PFAC) Action Plan (2009).

It is therefore desirable to use environmentally friendly coatings that have low refractive indices, a lower susceptibility to oxidative degradation, and a more consistent production profile (i.e., minimal property differences due to changes in manufacturing conditions). In addition, it is desirable to use coatings that have a suitable balance of properties including hardness (or modulus) and refractive index.

SUMMARY

Disclosed herein is a composition comprising 65 to 95 weight percent of a fluorinated monofunctional monomer; 5 to 35 weight percent of a fluorinated multifunctional monomer; and 0.5 to 3 weight percent of a silane coupling agent; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or $CF$ moieties; and where a crosslinked composition has a shore D hardness of 56 to 85 and has a refractive index (RI) that meets the limitation of the equation $RI \leq 1.368 + 10.8/X$, where X denotes wavelength in nanometers.

Disclosed herein too is a method comprising blending together 65 to 95 weight percent of a fluorinated monofunctional monomer; 5 to 35 weight percent of a fluorinated multifunctional monomer; 0.5 to 3 weight percent of a silane coupling agent to form a composition; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or $CF$ moieties; and where a crosslinked composition has a shore D hardness of 56 to 85 and has a refractive index (RI) that meets the limitation of the equation $RI \leq 1.368 + 10.8/X$, where X denotes wavelength in nanometers.

Disclosed herein too is an article comprising an optical fiber; a cladding comprising the reaction product of a composition comprising 65 to 95 weight percent of a fluorinated monofunctional monomer; 5 to 35 weight percent of a fluorinated multifunctional monomer; and 0.5 to 3 weight percent of a silane coupling agent; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or $CF$ moieties; and where a crosslinked composition has a shore D hardness of 56 to 85 and has a refractive index (RI) that meets the limitation of the equation $RI \leq 1.368 + 10.8/X$, where X denotes wavelength in nanometers; where the cladding contacts the optical fiber; and a buffer layer disposed upon the cladding.

DETAILED DESCRIPTION

Figure 1:
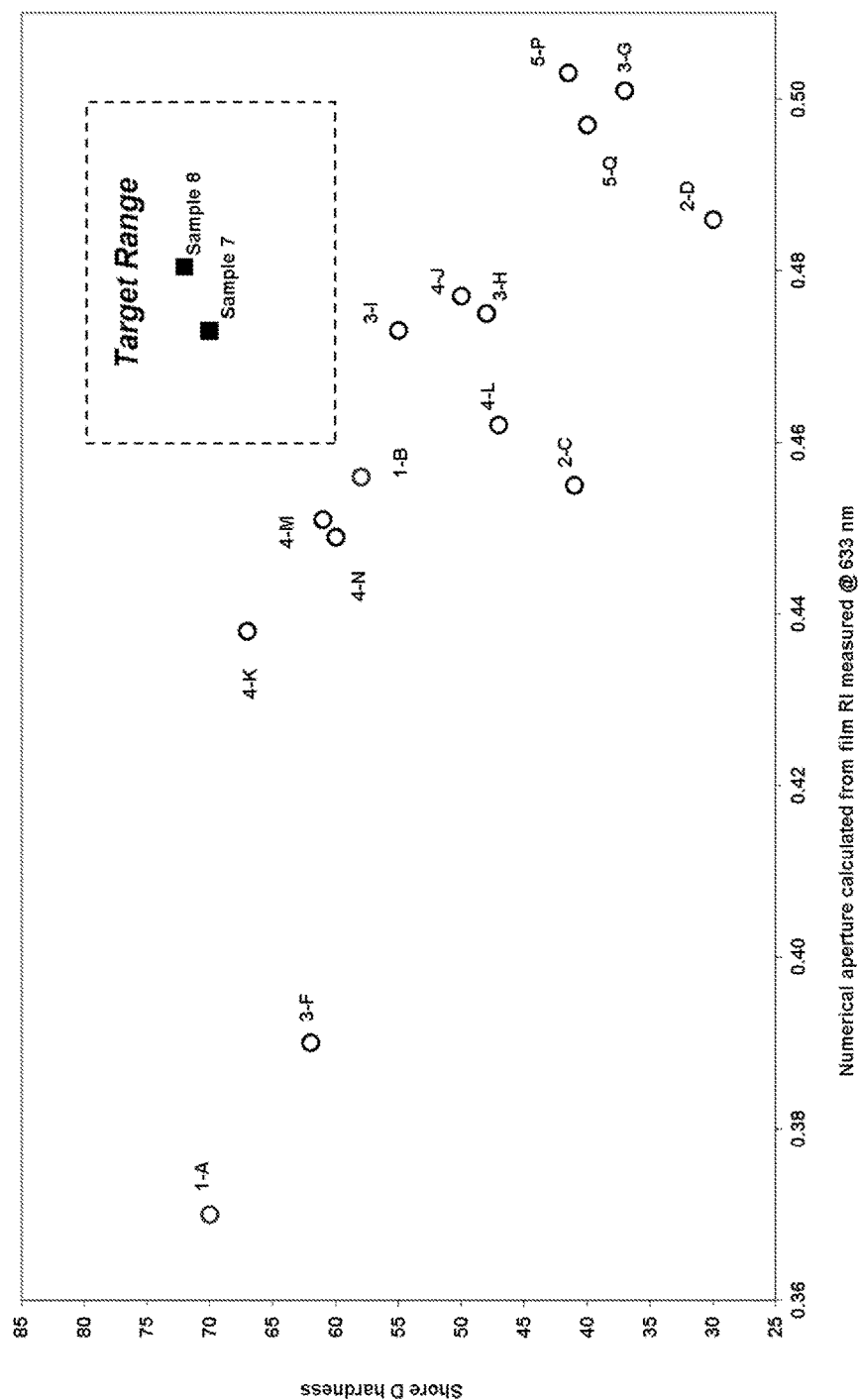
FIG. 1(A) is a graph that depicts the shore D hardness versus numerical aperture for inventive compositions (Sample 7 and Sample 8) and other comparative commercially available polymer claddings; except where noted, the numerical aperture values are calculated from measurements of refractive index on cladding films at 633 nm (cure dose 14 J/cm$^2$, not on an optical fiber substrate), referenced to a silica core; the Shore D hardness was measured in film form without an optical fiber substrate.
FIG. 1(B) is a graph that depicts that a particular inventive composition (Sample 13) displays higher thermal stability than two other comparative commercially available polymer claddings 1-A and 1-B (from Table 4); the data in FIG. 1B were generated using a lifetime criterion of 25% weight loss.
Figure 1:
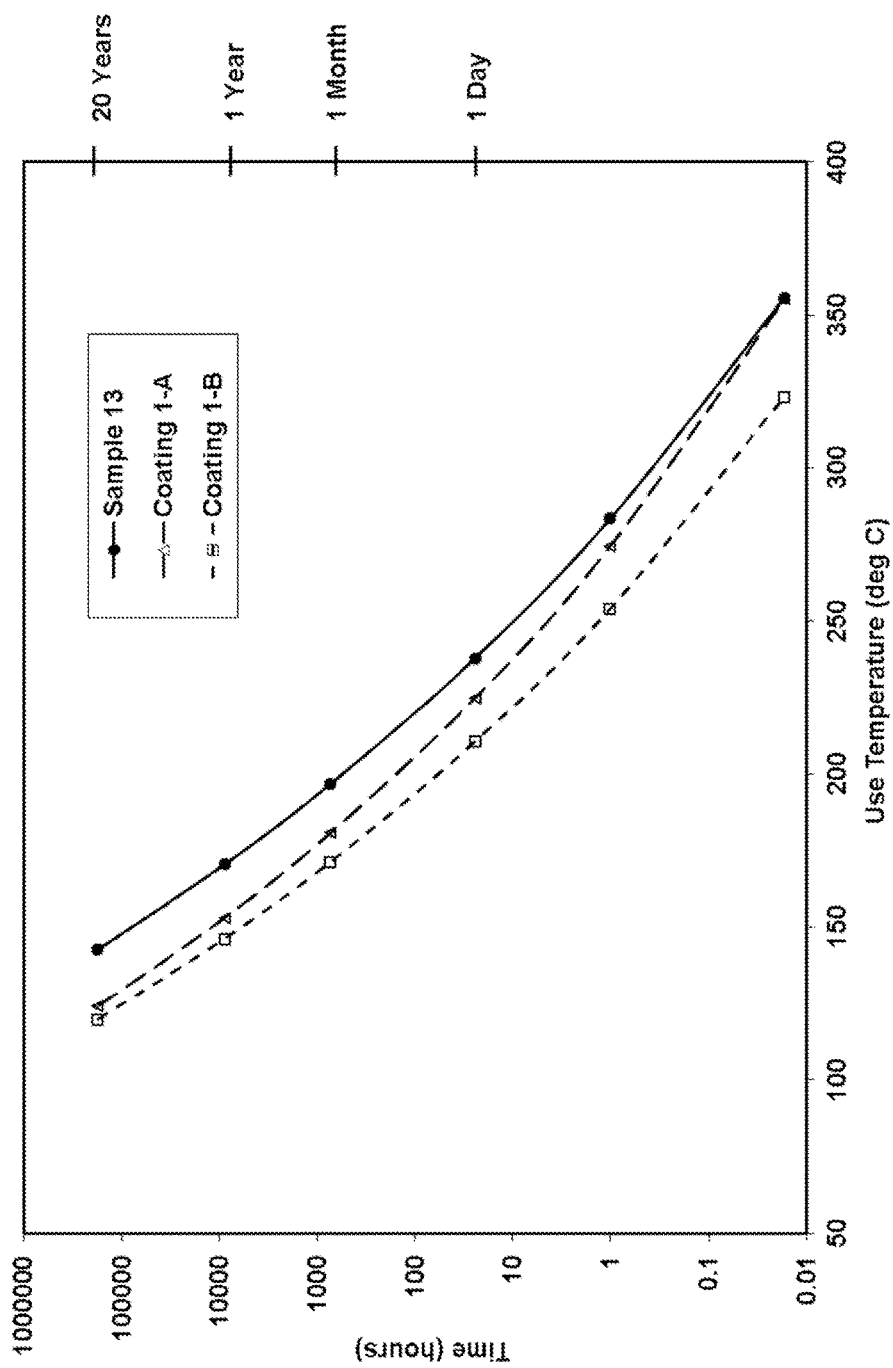

Disclosed herein is an improved curable polymer composition for use as an optical fiber cladding. The composition comprises fluorinated monofunctional and fluorinated multi-functional monomers. The cured composition displays a unique combination of properties in that it combines a high hardness (and high elastic modulus) with a low refractive index (and a high numerical aperture). The cured composition (also sometimes referred to as crosslinked composition or coating or cladding) forms lower refractive index coatings on the optical fiber (when compared with other commercially available comparative claddings) thus providing the optical fiber (e.g., fibers having a silica core) with a higher numerical aperture (NA) of up to about 0.50, while retaining high hardness (Shore D of 56 to 85) and displaying an elastic modulus of greater than 300 MPa at 23° C. The composition when used to coat optical fibers displays an improvement (over other commercially available coatings) in environmental resistance upon being subjected to thermal aging and aging in a humid environment, thermocycling, hot water soak, and upon exposure to high power in tight bends.

In a preferred embodiment as depicted in the FIG. 1(A), the crosslinked composition when disposed on an optical fiber produces a numerical aperture of greater than 0.46, preferably greater than 0.47, and more preferably greater than 0.48 while displaying a shore D hardness of 56 to 85, preferably 60 to 80 and more preferably 65 to 75.

In addition, the chemical components of the composition technically fall outside the category of PFOA-similar chemicals, as defined by the US EPA's Long-Chain Perfluorinated Chemicals (PFCs) Action Plan, published on Dec. 30, 2009. This is because the composition either does not contain trifluorocarbon (—CF$_3$) groups and/or has molecular chain lengths that are excluded from restricted categories. Components of the composition are selected to have low acidity, in order to maximize the shelf life of a silane-containing liquid, but also to have low basicity, so as to minimize post-draw corrosion of the glass fiber in humid environments. In an exemplary embodiment (which is discussed in detail later), when the number of fluorocarbon repeat units is greater than 6, both the fluorinated monofunctional monomers and the fluorinated multifunctional monomers do not contain trifluorocarbon (—CF$_3$) groups and when the number of fluorocarbon repeat units is less than 6 either or both of the monofunctional monomers and the fluorinated multifunctional monomers can optionally contain trifluorocarbon (—CF$_3$) groups. The fluorocarbon repeat units are CF$_2$ or CF moieties. The cladding is specifically devoid of the following types of fluorinated molecules:

$CF_3(CF_2)_n$—CH=CH$_2$;

$CF_3(CF_2)_n$—C(=O)—X where X is any chemical moiety;

$CF_3(CF_2)_m$—CH$_2$—X where X is any chemical moiety;

where n>5 or m>6.

The crosslinking reaction to produce the cladding on the optical fibers can be a free-radical reaction that is generally activated by the use of ultraviolet radiation. The crosslinking reaction may also be brought about by using cationic polymerization to effect the crosslinking of the composition. The fluorinated monofunctional monomers and the fluorinated multifunctional monomers disclosed herein have functional groups (such as ethylenically unsaturated functionalities, acrylate functionalities or methacrylate functionalities) that are cured using a free-radical reaction upon being activated by radiation. However, other monomers having reactive functionalities such as epoxide functionalities or vinyl ether functionalities may be crosslinked using cationic polymerization. In the case of free radical polymerization of fluorinated (meth)acrylates, fluorinated comonomers having other specific types of functionalities (thiol and/or vinyl and/or vinyl ether) can be used in limited amounts (where their mole fraction is less than 0.5 in comparison to the number of acrylate and/or methacrylate groups). In the case of cationic polymerization of epoxides or vinyl ethers, fluorinated comonomers containing alcohol functionalities may also be used in limited amounts (again, where their mole fraction is much less than 0.5, in comparison with the mole fraction of epoxide or vinyl ether groups).

The fluorinated monofunctional monomers comprise a fluorinated species having at least one reactive group that permits it to be covalently bonded within the crosslinked composition. In a preferred embodiment, the fluorinated monofunctional monomers comprise a fluorinated species having only one reactive group that permits it to be covalently bonded to the coating. The fluorinated species are devoid of any trifunctional fluorocarbon moieties when "n" the number of repeat units in the formulas below is greater than or equal to 6 and may optionally contain trifunctional fluorocarbon moieties when n is less than 6. The fluorinated species may include linear fluorinated species, a cyclic fluorinated species, a branched fluorinated species or a combination thereof. Linear fluorinated species are preferred. Linear fluorinated monofunctional monomers are represented by the chemical formula (1A)

$$R_1\text{---}(CF_2)_n\text{---}R_2 \quad (1A)$$

Cyclic fluorinated monofunctional monomers are represented by the chemical formula (1B)

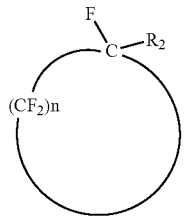
(1B)

where in the formulas (1A) or (1B), $R_1$ is a non-reactive end group that includes $CH_2F$ or $CHF_2$ but not $CF_3$, when n is greater than or equal to 6 and where $R_1$ is a non-reactive end group that includes $CH_2F$, $CHF_2$ or $CF_3$ when n is less than 6; where $R_2$ is a monofunctional reactive group that includes an ethylenically unsaturated functionality such as an acrylate, a methacrylate or a vinyl ether functionality; an epoxide functionality, a hydroxyl functionality, a vinyl ether functionality, or a thiol functionality. When the monofunctional reactive group $R_2$ comprises an acrylate or methacrylate functionality the species is preferably crosslinked via a free radical reaction.

In the formula (1) above, n is 1 to 15, preferably 6 to 10. In a preferred embodiment, $R_2$ comprises an ethylenically unsaturated functionality, preferably an acrylate or methacrylate functionality.

In a preferred embodiment, fluorinated monofunctional monomer has a number average molecular weight of less than 1200 grams per mole, preferably less than 1000 grams per mole, and more preferably less than 700 grams per mole. It is desirable for the fluorinated monofunctional monomer to have a flash point of greater than 60° C.

In a preferred embodiment, linear fluorinated monofunctional monomers represented by the chemical formula (2A) may also be used.

$$R_1\text{---}(CF_2)_n\text{---}(CH_2)_m\text{---}R_2 \quad (2A)$$

Cyclic fluorinated monofunctional monomers are represented by the chemical formula (2B) or (2C):

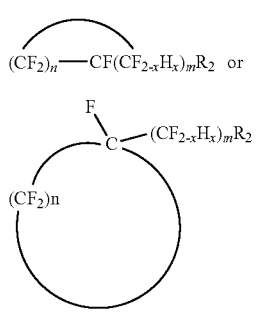

where in the formulas (2A), (2B) and (2C), $R_1$, $R_2$ and n are as detailed above and where m is 1 to 10, preferably 1 to 5 and more preferably 1 to 2. In an embodiment, the $R_2$ group is covalently bonded to the main structure through a C—O—C moiety except when $R_2$ is a thiol, an alcohol or an epoxide.

Branched fluorinated monofunctional monomers may also be used and are represented by the chemical formula (3)

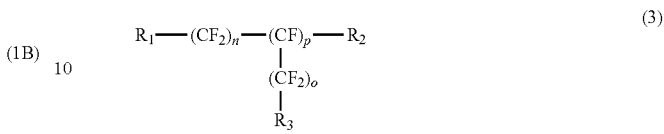

where $R_1$ and $R_3$ are non-reactive end groups that include $CH_2F$ or $CHF_2$ but not $CF_3$ when the sum of n and o are greater than or equal to 6 and include $CH_2F$, $CHF_2$ or $CF_3$ when the sum of n and o is less than 6; where $R_2$ is a monofunctional reactive group that includes an ethylenically unsaturated functionality (such as an acrylate functionality, a methacrylate functionality, or a vinyl ether functionality), an epoxide functionality, a hydroxyl functionality, or a thiol functionality.

In the formula (3) above, n and o are each independently 1 to 15, preferably 2 to 12 and more preferably 6 to 10, while p is 1 to 6, preferably 1 to 2. It is to be noted that the branched moieties may be randomly dispersed along the backbone of the fluorocarbon molecule. In a preferred embodiment, $R_2$ is an ethylenically unsaturated functionality, preferably an acrylate or a methacrylate functionality.

In another embodiment, branched fluorinated monofunctional monomers having the formula (4) below may also be used

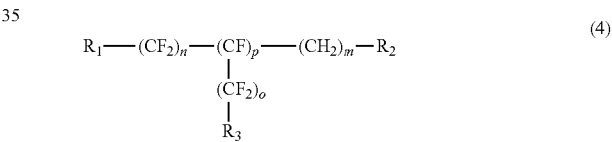

where $R_1$, $R_2$, $R_3$, n, o and p are as specified above in the formula (3) and m is as specified in the formula (2). The fluorinated monofunctional monomers of the formulas (1A), (1B), (2A), (2B), (2C), (3) and (4) may be used in any desired combinations with one another.

The fluorinated monofunctional monomers that may be used in the composition include 1,1-dihydroperfluorocyclohexane carbinol acrylate (also referred to herein as perfluorocyclohexylmethyl acrylate), 1,1-dihydroperfluorocyclohexane carbinol methacrylate, (also referred to herein as perfluorocyclohexylmethyl methacrylate), 1,1-dihydroperfluorocyclopentane carbinol acrylate, 1,1-dihydroperfluorocyclopentane carbinol methacrylate, 1H,1H,5H-octafluoropentyl acrylate, 1H,1H,5H-octafluoropentyl methacrylate, 1H,1H,11H-perfluoroundecyl acrylate, 1H,1H,9H-hexadecafluorononyl methacrylate, 1H,1H,9H-hexadecafluorononyl acrylate, 1H,1H,7H-dodecafluoroheptyl acrylate, 2-(perfluorohexyl)ethyl acrylate, 2-(perfluorohexyl)ethyl methacrylate, 2-propenoic acid,3,3,4,4,5,6,6,6-octafluoro-5-(trifluoromethyl)hexyl ester, 1H, 1H,2H,2H,3H,3H,4H,4H-perfluorodecyl acrylate, 2,2,3,3,4,4,5,5-octafluoropentyl acrylate, or the like, or a combination comprising at least one of the foregoing fluorinated monofunctional monomers.

Preferred linear fluorinated monofunctional monomer for use in the composition is 1H,1H,11H-perfluoroundecyl acrylate or 1H,1H,9H-hexadecafluorononyl acrylate. Preferred cyclic fluorinated monofunctional monomers are perfluorocyclohexylmethyl acrylate and perfluorocyclohexylmethyl methacrylate. The foregoing linear fluorinated monofunctional monomers and the foregoing cyclic fluorinated monofunctional monomers may be used in any desired combinations.

The fluorinated monofunctional monomers may be used in amounts of 65 to 95 weight percent (wt %), based on the total weight of the composition. In a preferred embodiment, the fluorinated monofunctional monomers may be used in amounts of 75 to 85 weight percent (wt %), based on the total weight of the composition.

The composition also comprises fluorinated multi-functional monomers. The fluorinated multi-functional monomers may have 2 or more functionalities. In an embodiment, the fluorinated multi-functional monomers may be bi-functional, tri-functional, tetra-functional, penta-functional, and so on. In a preferred embodiment, the fluorinated multi-functional monomers are bi-functional. The fluorinated multifunctional monomers may be linear, cyclic or branched.

In an embodiment, the fluorinated multi-functional monomers have the structure shown in the formulas (5) through (8)

  (5)

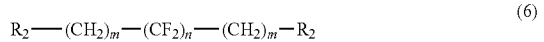  (6)

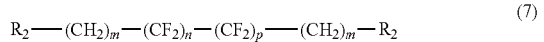  (7)

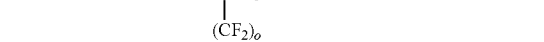

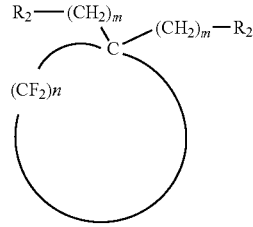  (8)

where $R_2$ is a reactive group that includes an ethylenically unsaturated functionality (e.g., acrylate, methacrylate or vinyl ether). Acrylate or methacrylate reactive groups are used when the cladding is produced via a free radical reaction; in those cases, a thiol functionality or vinyl ether functionality may also be used in fluorinated co-monomers at mole fractions much less than 0.5. Reactive groups $R_2$ that comprise an epoxide functionality or a vinyl ether functionality may be used if the cladding is produced via cationic polymerization; in those cases, reactive functionalities that include hydroxyl or alkoxysilane may be used in small amounts. With reference now to the formulas (5)-(8), the reactive group $R_2$ is covalently bonded to the ethylene linkages by a C—O—C linkage except when $R_2$ is thiol or alcohol or epoxide.

In the formulas (5) through (8) above, n and o are 1 to 15, preferably 2 to 12 and more preferably 4 to 10 while m is 1 to 10, preferably 1 to 5 and more preferably 1 to 2. In the formula (7), p is 1 to 6, preferably 1 to 2. It is to be noted that the branched moieties of formula (7) may be randomly dispersed along the backbone of the fluorocarbon oligomer. $R_3$ in the formula (7) may be reactive or non-reactive. In a preferred embodiment, $R_2$ is an ethylenically unsaturated functionality, preferably an acrylate or a methacrylate functionality.

Preferred fluorinated multi-functional monomers have the structure of formula (9)

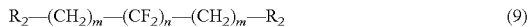  (9)

where in the formula (9), $R_2$ is an acrylate group, n is from 1 to 15, preferably 4 to 10, and m is 1 to 10, preferably 1 to 2. Preferred fluorinated multi-functional monomers are 2,2,3,3,4,4,5,5-octafluoro-1,6-hexanediol diacrylate and 2,2,3,3,4,4,5,5,6,6,7,7-dodecafluoro-1,8-octanediol diacrylate.

The fluorinated multifunctional monomers may be used in amounts of 5 to 35 weight percent (wt %), based on the total weight of the composition. In a preferred embodiment, the fluorinated multifunctional monomers may be used in amounts of 10 to 25 wt %, based on the total weight of the composition.

The composition further comprises a silane coupling agent that does not contain an amine functionality. The silane coupling agent facilitates bonding of the composition to the optical fiber during application and after curing of the composition to form the coating. In the case of (meth) acrylate-based formulations, it is desirable for the silane coupling agent to comprise at least one functional group capable of participating in a free-radical polymerization reaction with the fluorinated mono- and poly-unsaturated monomers, and it is further desirable for the silane coupling agent to have at least one alkoxy silane group capable of condensation to form an Si—O—Si bond with the optical fiber. In the case of epoxy or vinyl-ether based formulations, it is desirable for the silane coupling agent to comprise at least one functional group capable of participating in a cationic polymerization reaction with the respective fluorinated monomer type, as well as also to have at least one alkoxy silane group capable of condensation to form an Si—O—Si bond with the optical fiber.

Upon being irradiated or upon being subjected to thermal heating, the silane coupling agent reacts with either the fluorinated monofunctional monomer or the fluorinated difunctional monomer. Some of the silane functionalities react with the silica on the optical fiber to provide an improved bond with the optical fiber. As noted above, cationic polymerization is generally used when the monomers have reactive functionalities that are epoxides or vinyl ethers.

Examples of suitable silanes for free radical curing formulations are γ-methacryloxypropyltrimethoxysilane, γ-acryloxypropyltrimethoxysilane, γ-methacryloxypropyltris(β-methoxyethoxy)silane, γ-acryloyloxypropyltris(β-methoxyethoxy)silane, γ-mercaptopropyltrimethoxysilane, γ-mercaptopropyltriethoxysilane; examples of suitable silanes for cationic epoxy curing formulations are γ-glycidoxypropyltrimethoxysilane, γ-glycidoxypropylmethyldiethoxysilane, β(3,4-epoxycyclohexyl)ethyltrimethoxysilane, or the like, or a combination comprising at least one of the foregoing silane coupling agents. A preferred silane coupling agent is γ-acryloyloxypropyltrimethoxysilane. The silanes that have glycidoxy moieties are used in cationic polymerizations that employ monomers that are epoxy functionalized. Silanes containing vinyl ether reactive groups are likewise suitable for formulations based on cationically curable vinyl ethers.

The silane coupling agent may be used in amounts of 0.5 to 3 weight percent (wt %), based on the total weight of the composition. In a preferred embodiment, the silane coupling agent may be used in amounts of 1.0 to 2.0 weight percent (wt %), based on the total weight of the composition.

The composition may further comprise an optional thiol synergist. Thiol synergists are generally only used in the free-radically cured acrylate or methacrylate compositions. The thiol synergist increases cure speed but can sometimes reduce crosslink density and adversely increase refractive index. Thiol synergists are therefore generally used in very small amounts when used. Illustrative thiol synergists are disclosed in U.S. Pat. No. 4,511,209, the entire contents of which are hereby incorporated by reference. Examples of thiol synergists are γ-mercaptopropyltrimethoxysilane, γ-mercaptopropyltriethoxysilane, pentaerythritol tetrakis(3-mercaptopropionate) or the like, or a combination comprising at least one of the foregoing thiol synergists. The thiol synergists are used in amounts of preferably up to 3 wt %, and more preferably 0.1 to 1 wt %, based on the total weight of the composition.

The composition may further comprise one or more of the following additives: an initiator, an antioxidant, thermal stabilizers, UV stabilizers, surface-tension modifying additives, slickness agents, or a combination comprising at least one of the foregoing additives. Preferred additives are photoinitiators and antioxidants.

Photoinitiators may be used in amounts of 0.01 to 5 wt %, more preferably 0.5 to 1.5 wt %, based on the total weight of the composition. The photoinitiators can be free radical type or cationic type, depending on whether monomers are acrylates or methacrylates (for the free radical type) or epoxides or vinyl ethers (for the cationic types). An exemplary photoinitiator is IRGACURE® 1173.

In one embodiment, in one method of manufacturing the composition, the fluorinated monofunctional monomer, the fluorinated multifunctional monomer, the silane coupling agent, a photoinitiator and optionally the thiol synergist are blended together to form the composition. The composition may be manufactured in a batch or in a continuous process.

The composition may be blended by simple mixing on e.g., magnetic stir plates or possibly in larger volume with e.g., a propeller blade on a rotating stir shaft. Heat may or may not be needed. Heating is needed in cases where the monomers are not liquid at room temperature. For example, 1H, 1H, 11H-perfluoroundecyl acrylate of Sample 13 of the Examples is a solid wax that melts at ~45° C.

The composition is then disposed on an optical fiber and subjected to curing or crosslinking. Crosslinking is generally conducted using electromagnetic radiation. Electromagnetic radiation includes ultraviolet (UV) radiation, microwave radiation, electron beam radiation, or a combination thereof. A preferred form of radiation for crosslinking the composition is ultraviolet radiation.

The composition prior to crosslinking has a low viscosity of less than 100 centipoise preferably less than 20 centipoise at the application temperature. Without being limited by theory, the low viscosity is due to the nature of selected components (significant fluorine content, relatively low molecular weight, and low concentration of hydrogen bonding groups) present in the composition. These coatings can be readily applied using either an open-cup applicator or applicators as described in U.S. Pat. No. 6,958,096 to Lindholm. Additional types of coating applications may be used such as, for example, spray or aerosol delivery. The compositional ingredients prior to crosslinking also each have relatively low volatility at atmospheric pressure, to allow stable processing while coating optical fibers. Their "flash point" values are generally greater than or equal to 70° C., preferably greater than or equal to 100° C.

The crosslinking of the composition may be conducted using a UV radiation dosage having an energy density of 0.1 to 15 Joule per square centimeter ($J/cm^2$) after it is disposed on an optical fiber. In a preferred embodiment, the curing of the composition may be conducted using a radiation dosage having an energy density of 0.5 to 1.5 $J/cm^2$ after it is disposed on an optical fiber. The ultraviolet radiation may be a combination of ultraviolet A, ultraviolet B, ultraviolet C radiation, or a combination comprising at least one of the foregoing forms of ultraviolet radiation.

The crosslinked composition is generally used as a coating on an optical fiber and has a refractive index that is lower than that of the glass portion of the optical fiber, which permits use of the fiber for guiding light within the core of the fiber. For a silica-based optical fiber, the use of the crosslinked composition having a refractive index that is less than that of the silica-based core facilitates its use as an optical cladding for guiding light within the silica-based core. The crosslinked composition has a superior balance of refractive index and mechanical properties including hardness, elastic modulus, and adhesion to glass, with respect to other comparative commercially available polymer claddings.

The crosslinked composition preferably has a refractive index of less than that of silica (i.e., preferably less than about 1.45 at 850 nanometers). In one embodiment, the crosslinked composition (i.e., the coating) has a refractive index of less than about 1.38 at 850 nanometers. Most preferably the crosslinked composition has a refractive index (RI) that is related to wavelength by the equation RI≤1.368+10.8/X, where X denotes wavelength in nanometers. Table 1 below shows how the refractive index varies as a function of wavelength.

TABLE 1

| Wavelength (nm) | Maximum RI of cured cladding |
| --- | --- |
| 400 | 1.395 |
| 589 | 1.386 |
| 633 | 1.385 |
| 790 | 1.383 |
| 850 | 1.381 |
| 1538 | 1.375 |
| 2100 | 1.373 |

The crosslinked composition is polymeric and therefore viscoelastic, which means that the coating modulus is dependent upon time and temperature. The elastic modulus value may be quantified using dynamic mechanical analysis (DMA) at a selected frequency of cyclic strain. In one embodiment, the coating displays a dynamic elastic modulus of greater than 200 MPa, preferably greater than 350 MPa, and most preferably in the range 400-1000 MPa at 23° C. when tested at a frequency of 1 radian per second. The corresponding glass transition temperature, Tg, (as measured by the DMA tan delta peak temperature at a cyclic strain rate of 1 rad/s) is greater than 30° C., and preferably greater than 40° C. The Shore D hardness, measured using an in-house sample preparation technique, should be in the range 56 to 85 and preferably 60 to 80.

Optical fibers with the inventive coating compositions can be proof tested at levels greater than or equal to 75 kpsi (kilopounds per square inch), preferably at levels greater than or equal to 150 kpsi, with low frequency of breaks or formation of point defects. Fibers with glass diameters of 200 micrometers can be routinely tested and withstand a tensile proof test load of greater than 150 kpsi, while fibers with glass diameters of 400 micrometers can be tested and can withstand either a tensile proof test load of greater than 100 kpsi or a radial bend with a proof-test load of 100 kpsi using wheels having bend radius of 38.4 mm. Fibers with glass diameters of greater than 400 micrometers and up to 2000 micrometers can be tested and can withstand a radial bend with a proof-test load of greater than 75 kpsi using wheels having bend radius that are selected in accordance with the glass diameter.

The coated optical fiber may be over-coated or buffered with a second layer. The primary (disclosed) coating is applied and cured on an optical fiber in a relatively thin single layer, then overcoated or buffered with a secondary layer (e.g., an extruded thermoplastic or a UV-cured coating). The optical fiber is designed so that the secondary layer provides added robustness (abrasion resistance; optionally, flame resistance) and can be removed for termination or other types of fiber end preparation, while the polymer cladding layer is not removed. The polymer cladding (primary coating) thickness is 2 to 30 micrometers, typically 10 to 15 micrometers, depending upon the substrate glass fiber diameter and the fiber drawing conditions. The second layer (i.e., the buffer) may comprise ethylene tetrafluoroethylene (ETFE) thermoplastic, although fiber designs are not limited to use of this material. Alternative buffers include extruded nylon thermoplastic or UV-cured acrylate, UV-cured epoxy, flame-retardant UV-cured coatings, thermally or UV-cured silicones, multi-layer buffers, or the like. The thickness of the second layer may be adapted in accordance with the glass diameter. For example, the thickness of the buffer atop a 230 micrometer diameter polymer cladding is about 135 micrometers.

In an embodiment, the coatings can also be used as secondary claddings atop glass-clad optical fibers, in cases where maximum power confinement and transmission are needed. This includes wavelengths in the range of 350 to 2200 nanometers.

The coated optical fiber (both with and without the second layer) displays a delamination resistance of the polymer cladding, to withstand traverse over capstans and pull wheels during fiber drawing, take-up, and respooling. In the case where a second layer (or buffer) is utilized, the fiber displays a capability to mechanically strip and remove the outer layer without scratching or tearing the underlying polymer cladding layer using conventional fiber strip tools (also manifested as "fingernail scratch resistance") that is greater than other comparative commercially available optical fibers that are coated with comparative commercially available coatings.

Optical fibers coated with the composition display a capability to terminate the fiber using "crimp and cleave" methodology, established for HCS® fibers, leaving the polymer cladding in place. Optical fibers coated with the composition display a capability to terminate the fiber using an epoxy/polish methodology, leaving the cladding intact while the optical fiber end is polished for the end-use application.

The cured coating provides superior thermal and thermo-oxidative stability and displays fewer tendencies to yellow, in comparison with polymer claddings disclosed elsewhere and when compared with other comparative commercially available compositions. This is particularly true in comparison with claddings that are urethane-based or polyether-based.

When utilized as a polymer cladding on an optical fiber, the cured coating provides particularly low optical attenuation in the visible wavelength range and good resistance to change in attenuation upon environmental exposures in comparison with polymer claddings disclosed elsewhere and when compared with other comparative commercially available compositions. This has been demonstrated on exemplary fibers in the following types of environmental exposures:

Thermocycling in the range −65° C. to +125° C.
Hot, humid aging per FOTP-72, which includes cycling to temperatures up to +85° C. at 85% relative humidity, followed by thermocycling to sub-zero temperature (−10° C.)
Heat aging at 150° C. (24 hours)
Fiber bending under laser power
Soaking in hot water.

In addition, the coating provides superior resistance to thermo-oxidative scission, as demonstrated in thermogravimetric tests (weight loss vs. temperature and/or time, in air).

The composition along with its use in optical fibers is detailed in the following non-limiting examples.

EXAMPLES

Example 1

This example was conducted to demonstrate the composition comprising fluorinated monofunctional monomers (monoenes) and fluorinated di-functional monomers. A series of fluorinated mono- and di-(meth)acrylate monomers were obtained as listed in Table 2. These included both linear-chain and cycloaliphatic monoenes. Selected liquid properties (refractive index, optical absorbance, and viscosity) were measured at 30° C., where feasible. F20 monoacrylate is a wax at room temperature; hence, its liquid properties were measured at 50° C. DDFODDA was predominantly liquid at room temperature, but (as sourced) exhibited a crystalline fraction that created some haze, so its absorbance was measured at both 30 and 50° C.; haze was minimal at the higher temperature. PFHXEMA and PFHXEA, as sourced, displayed higher yellowness than the other monomers. All acronyms are detailed in the Table 2 below.

To characterize factors that might affect ultimate performance, individual monomers were homopolymerized by incorporating 1 wt. % of a photoinitiator (2-hydroxy-2-methyl-1-phenyl-propan-1-one, Irgacure 1173, BASF), then exposing to UV radiation at a dose of 1 J/cm$^2$ in a nitrogen environment. Films were prepared by curing the liquids between glass and quartz slides (the top slide being quartz) having a thin spacer between the slides, then prying apart the slides after cure. A cured film remained preferentially attached to one of the slides and was then used for measuring refractive index. Refractive indices of films were measured at three wavelengths using a Metricon prism coupler. Samples for Shore D hardness measurements were prepared by UV curing droplets in small aluminum pans (such as those sold for differential scanning calorimetry, DSC, by companies such as TA Instruments or Perkin Elmer).

All of the fluorinated monomers displayed post-cure refractive index values in the range 1.37 to 1.43 at wavelengths in the range 633-1538 nanometers, well below that of the silica core (RI~1.4585), as shown in Table 3. All of the monoacrylates displayed low mechanical integrity as homopolymers. Among these, the F20 acrylate (Sample 1) was most manageable, producing a soft hazy film, though not easily removed from the substrate without breaking, and having a Shore D hardness of 42. A shorter-chain monoacrylate, DDFHPA (Sample 2), produced only a viscous liquid, so that refractive index after cure was not measured. The fluorinated cycloaliphatic monoacrylate, PFCHMA (Sample 4), produced a soft film enabling RI measurement, but its Shore D hardness was not easily measured. Its methacrylate counterpart, PFCHMMA (Sample 3), would not homopolymerize readily at the original photoinitiator level and UV dose, so both factors were increased five-fold in order to produce a film for the RI test. OFHDDA and DDFODDA diacrylates, each having two functional groups per molecule, are capable of imparting cross-links; these produced high hardness as homopolymers (Shore D 88 and 94, Samples 5 and 6, respectively), but the resulting films were brittle.

Mixtures of the monomers were next explored (see also Table 3), incorporating 1.5 wt % of γ-acryloxypropyl trimethoxysilane (APTMS) (a silane coupling agent), purchased as SIA0200.0 from Gelest. APTMS was selected because: (i) it contains a reactive acrylic group that can copolymerize readily with other acrylic monomers; (ii) it does not significantly increase the refractive index of the formulation; and (iii) it results in relatively long shelf life when used in acrylate-based coating formulations, in comparison with other silanes (e.g., mercaptosilanes). Among the compositions tested, several combined F20 monoacrylate with a fluorinated diacrylate to produce a superior balance of hardness (69 to 72) and predicted NA value (0.47 to 0.49).

Samples 1-6 of the Table 3 show comparative compositions that comprise either 100 wt % of the crosslinked fluorinated monofunctional monomer or 100 wt % of the crosslinked fluorinated difunctional monomer.

Samples 7-12 of the Table 3 each comprise mixtures of the fluorinated monofunctional monomer and the fluorinated difunctional monomer. Sample 7 has a low refractive index that is predicted to enable a numerical aperture, NA, of ~0.47 on a silica fiber. Sample 7 combines F20 fluorinated monoacrylate with OFHDDA fluorinated diacrylate in an 80:20 ratio, with the further addition of the photoinitiator and the silane coupling agent. At room temperature, this composition is a semi-wax, which becomes a clear liquid once it is heated above 40° C. The crosslinked composition is clear (i.e., it is transparent with no haze). Table 3 shows the main properties of the crosslinked composition.

The crosslinked composition is harder than most comparative commercially available polymer claddings, especially those having an equivalent refractive index (see Table 3 and FIG. 1). The obtained Shore D hardness (70) for the Sample 7 (the inventive composition) is the same as that for the cladding used on the comparative commercially available OFS Medium NA HCS® cladding (Sample 1-A in Table 4), but the refractive index for Sample 7 is significantly lower (i.e., the NA is higher). Based on the measured cladding hardness, it is believed that a corresponding fiber (having the crosslinked coating of Sample 7 and if buffered with ETFE) would be mechanically robust and provide satisfactory crimp and cleave termination.

The viscosity of the liquid formulation has not been measured. However, based on the viscosities of the individual components it was projected to fall in the range 5-8 cP, rendering it suitable for application, e.g., using an open-cup coating applicator or a low-pressurize counter-flow applicator of the type described by Lindholm in U.S. Pat. No. 6,958,096.

TABLE 2

| | | | | | Optical | | | Literature values | |
|---|---|---|---|---|---|---|---|---|---|
| Abbreviation | Common name | Mol Wt. | Source | Product Name or number | Refractive Index (589.3 nm) | Absorbance @ 500 nm (1-cm path) | Brookfield Viscosity (cP) | Flash Point (° C.) | Density @ 20° C. (g/ml) |
| F20 | 1H,1H,11H-perfluoroundecyl acrylate | 586.17 | SiVance | Custom | 1.3280 @ 50° C. | 0.030 @ 50° C. | 7.5 @ 50° C. | >110 | 1.5920 |
| DDFHPA | 1H,1H,7H-Dodecafluoroheptyl acrylate | 386.13 | SynQuest Laboratories | 2324-3-23 | 1.3420 | 0.068 | 5.1 | 101 | 1.5810 |
| PFCHMMA | Perfluorocyclohexylmethyl methacrylate | 380.15 | Monomer-Polymer & Dajac Labs | 9131 | 1.3583 | 0.081 | 4.4 @ 25° C. 3.9 @ 30° C. | Not available | Not available |
| PFCHMA | Perfluorocyclohexylmethyl acrylate | 366.10 | | 8955 | 1.3496 | 0.061 | 3.6 | 71.7 | 1.5700 |
| OFHDDA | Octafluoro-hexanediol diacrylate | 370.19 | | 9400 | 1.3900 | 0.050 | 8.1 | >110 | 1.2537 |
| DDFODDA | Dodecafluoro-octanediol diacrylate | 470.20 | | 1239 | 1.3396 | 0.650 @ 30° C. 0.080 @ 50° C. | 14.3 | Not available | Not available |
| PFHXEMA | Perfluorohexylethyl methacrylate | 432.18 | duPont | Capstone 62-MA | 1.3464 | 0.202 | 4.4 | Does not ignite | 1.6000 |
| PFHXEA | Perfluorohexylethyl acrylate | 418.11 | | Capstone 62-AC | 1.3396 | 0.226 | 4.5 | 101 | 1.5540 |

TABLE 3

| | Composition | | | | | | | | | | | |
|---|---|---|---|---|---|---|---|---|---|---|---|---|
| | 1* | 2* | 3* | 4* | 5* | 6* | 7 | 8 | 9 | 10 | 11 | 12 |
| F20 | 100 | | | | | | 80 | 80 | 85 | 90 | | |
| DDFHPA | | 100 | | | | | | | | | 80 | 90 |
| PFCHMMA | | | 100 | | | | | | | | | |
| PFCHMA | | | | 100 | | | | | | | | |
| OFHDDA | | | | | 100 | | 20 | | | | | |
| DDFODDA | | | | | | 100 | | 20 | 15 | 10 | 20 | 10 |
| Irgacure 1173 | 1 | 1 | 5 | 1 | 1 | 1 | 1 | 1 | 1 | 1 | 1 | 1 |
| APTMS | | | | | | | 1.5 | 1.5 | 1.5 | 1.5 | 1.5 | 1.5 |
| UV dose (J/cm$^2$) | 1 | 1 | 5 | 1 | 1 | 1 | 1 | 1 | 1 | 1 | 1 | 1 |
| RI @ 633 nm | 1.3771 | 1.3961 | 1.3817 | 1.4265 | 1.4093 | 1.3783 | 1.3758 | 1.3747 | 1.3740 | 1.3764 | 1.3718 |
| RI @ 790 nm | 1.3748 | 1.3933 | 1.3796 | 1.4240 | 1.4065 | 1.3764 | 1.3743 | 1.3727 | 1.3717 | 1.3743 | 1.3695 |
| RI @ 1538 nm | 1.3699 | 1.3877 | 1.3752 | 1.4190 | 1.4015 | 1.3722 | 1.3698 | 1.3684 | 1.3675 | 1.3701 | 1.3654 |
| NA @ 633 nm | 0.477 | 0.418 | 0.463 | 0.298 | 0.371 | 0.473 | 0.481 | 0.484 | 0.486 | 0.479 | 0.492 |
| NA @ 790 nm | 0.473 | 0.416 | 0.459 | 0.294 | 0.369 | 0.469 | 0.475 | 0.480 | 0.482 | 0.475 | 0.489 |
| NA @ 1538 nm | 0.459 | 0.401 | 0.442 | 0.271 | 0.350 | 0.452 | 0.459 | 0.463 | 0.466 | 0.458 | 0.472 |
| Shore D hardness | 42 | 0 | — | 0 | 88 | 94 | 70 | 72 | 71 | 69 | — | — |

*comparative compositions

TABLE 4

| Manufacturer ID | Cladding ID | Elastic modulus @ 23° C. & 1 rad/s (MPa) 1 J/cm$^2$ | Elastic modulus @ 23° C. & 1 rad/s (MPa) 14 J/cm$^2$ | Glass transition temperature @ 1 rad/s (° C.) 1 J/cm$^2$ | Glass transition temperature @ 1 rad/s (° C.) 14 J/cm$^2$ | Shore D Hardness | Numerical aperture[1] | PFOA similar components |
|---|---|---|---|---|---|---|---|---|
| 1 | Sample 7 (Table 3) | — | — | — | — | 70 | 0.473 | No |
| 1 | Sample 8 (Table 3) | — | — | — | — | 72 | 0.481 | No |
| 1* | A | ~860 | — | 57 | — | 70 | 0.370 | No |
| 1* | A' | — | — | — | — | <70 | 0.430 | No |
| 1* | B | 148-313 | 197-362 | 45-59 | 50-61 | 58 | 0.456 | No |
| 2* | C | 51 | 104 | 24 | 30 | 41 | 0.455 | No |
| 2* | D | — | 25 | — | 7 | 30 | 0.486 | No |
| 2* | E | Mechanical and optical properties similar to cladding 2-D | | | | | | No |
| 3* | F | — | — | — | — | 62 | 0.390[2] | Yes |
| 3* | G | 41 | 78 | 10 | 23 | 37 | 0.501 | Yes |
| 3* | H | 27 | 96 | 25 | 53 | 48 | 0.475 | Yes |
| 3* | I | 71 | 170 | 34 | 61 | 55 | 0.473 | Yes |
| 4* | J | — | — | — | — | 50 | 0.477 | No |
| 4* | K | — | — | — | — | 67 | 0.438 | No |
| 4* | L | — | 158 | — | 51 | 47 | 0.462 | No |
| 4* | M | — | 295 | — | 53 | 61 | 0.451 | No |
| 4* | N | — | 267 | — | 57 | 60 | 0.449 | No |
| 4* | O | — | — | — | — | Did not cure well | | No |
| 5* | P | 100 | 106 | 43 | 46 | 41.5 | 0.503 | No |
| 5* | Q | 121 | 182 | 45 | 58 | 40 | 0.497 | No |

*Comparative compositions
[1] Except where noted, NA was calculated from cladding film refractive index measured @ 633 nm, assuming application to a silica core; cure dose 14 J/cm$^2$
[2] Measured on fiber at 850 nm wavelength The comparative samples 1-A through 5-Q are obtained from external commercial suppliers as well as internally from OFS. From Table 3 it may be seen that refractive index of the exemplary crosslinked compositions of Samples 7-12 varies from about 1.36 to about 1.38 when measured at wavelengths between 600 to 1600 nanometers after being subjected to a UV dosage of 1 Joule per square centimeter.

Example 2

This example was conducted to demonstrate the composition comprising fluorinated monofunctional monomers (monoenes) and fluorinated di-functional monomers.

Sample 13 similar to Sample 7 (of Table 3) was prepared with the formulation having the proportions displayed in Table 5.

TABLE 5

| Composition | Wt % |
|---|---|
| F20 (Fluoroacrylate) | 80 |
| OFHDDA | 20 |
| APTMS silane | 1 |
| Irgacure 1173 | 1 |

Figure 2:
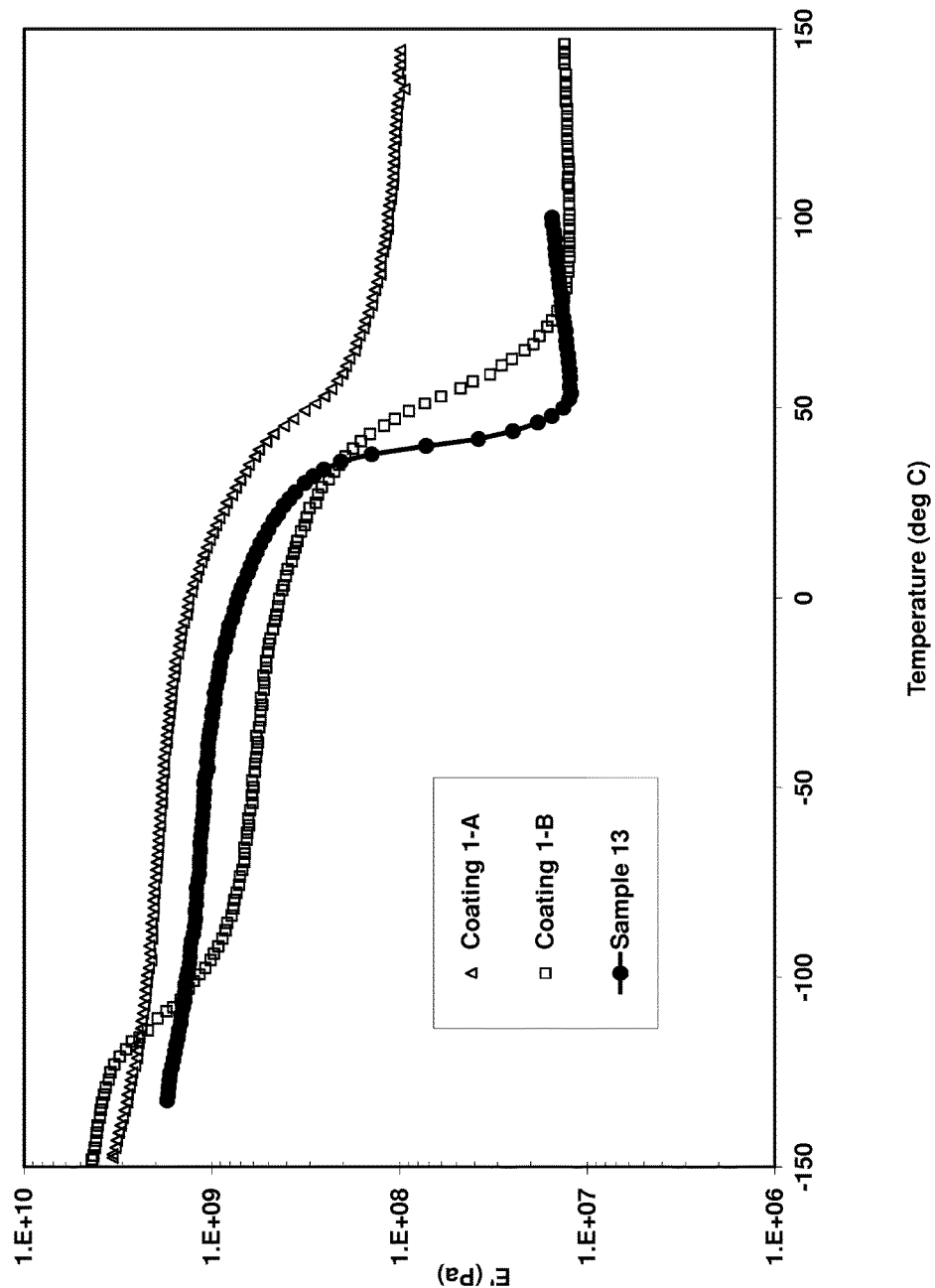
FIG. 2 is a graph that shows dynamic elastic modulus of films (not disposed on a silica optical fiber) comparing commercially available polymer claddings 1-A and 1-B (from Table 4) and the inventive composition (Sample 13)
Figure 3:
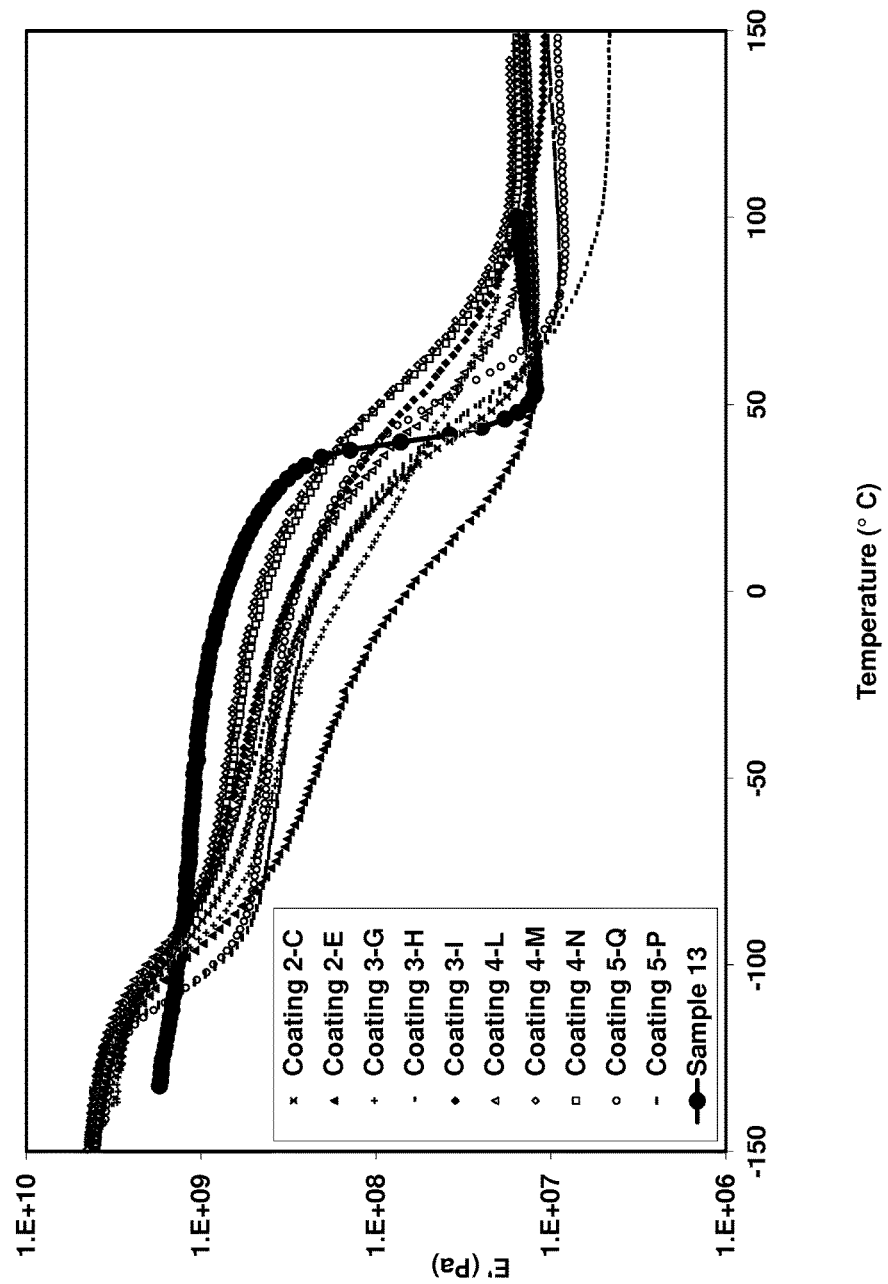
FIG. 3 is a graph that shows dynamic elastic modulus of films (not disposed on a silica optical fiber) comparing some of the commercially available polymer claddings (from Table 4) and the inventive composition (Sample 13)

A film (labeled Sample 13) was UV cured at 2 J/cm², and its thermo-oxidative stability was examined using a thermo-gravimetric analysis. The test method was in accordance with a published approach (A. A. Stolov, D. A. Simoff, J. Li, *Thermal stability of specialty optical fibers*, J. Lightwave Tech., 2008, Vol. 26, pp 3443-3451). FIG. 1(B) is a graph that depicts that the inventive composition (Sample 13) displays higher thermal stability than two other comparative commercially available polymer claddings: 1-A and 1-B (from Table 4). Dynamic elastic modulus at room temperature was found to be 425 MPa, intermediate between those of claddings 1-A and 1-B, and significantly higher than other commercial claddings in this refractive index regime (See FIGS. 2 and 3). FIG. 2 is a graph (obtained from performing dynamic mechanical spectroscopy) that compares the elastic modulus of commercially available polymer claddings 1-A and 1-B and the inventive composition (Sample 13) while the FIG. 3 is a graph (obtained from performing dynamic mechanical spectroscopy) comparing the elastic modulus of other commercially available polymer claddings (from Table 4) and the inventive composition (Sample 13).

Example 3

This example was conducted to demonstrate the properties of fibers that were coated (cladded) with the disclosed crosslinked composition comprising fluorinated monofunctional monomers (monoenes) and fluorinated di-functional monomers and further having disposed upon the cladding a buffer comprising ETFE.

Fibers were drawn using two formulations of the present invention having a NA ~0.47, similar to those detailed in Table 3 (in particular Samples 7 and 10 from Table 3). For comparison, fiber was also drawn using a comparative commercially available cladding, similar to composition 1-A' in Table 4 having lower NA (~0.44). The nominal fiber diameters were 200/230/500 μm/μm/μm (glass/cladding/ETFE buffer outer diameters, respectively) using a Heraeus F300 pure silica preform. The collected fiber lengths were in the range 1 to 2.2 km. All three fiber lots exhibited low optical attenuation as-drawn, in the range 2.2 to 3.3 decibel per kilometers (dB/km) at a wavelength of 850 nm. The new higher-NA claddings resulted in slightly improved (lower) attenuation at 980 nm in comparison with the lower-NA cladding (3.7 and 4.1 dB/km vs. 6.0 dB/km, respectively). Details of the crosslinked compositions and the buffer for these fibers are provided in Table 6 below.

TABLE 6

| Fiber ID | Sample 15* | Sample 16 | Sample 17 |
|---|---|---|---|
| Cladding formulation | Similar to prior-art cladding 1-A', Table 4 | Similar to Sample 7 Table 3 | Similar to Sample 10 Table 3 |
| F20 Acrylate | 84.2 | 80 | 90 |
| Non-fluorinated crosslinker monomers | 13.8 | | |
| OFHDDA | | 20 | |
| DDFODDA | | | 10 |
| Irgacure 1173 | 1 | 1 | 1 |
| Acryloxypropyl trimethoxy silane | 1 | 1 | 1 |
| Expected Shore D hardness | <70 | 70 | 69 |
| Measured fiber NA @ 633 nm | 0.439 | 0.468 | 0.470 |
| Attenuation, 100-gm tension, as-drawn (dB/km) | | | |
| 630 nm | 7.5 | 6.2 | 11.6 |
| 850 nm | 3.3 | 2.2 | 3.2 |
| 980 nm | 6.0 | 4.1 | 3.7 |
| Attenuation, 100-m loose coils after 24 hr @ 150 C. (dB/km) | | | |
| 630 nm | 20.6 | 17.2 | 44.2 |
| 850 nm | 3.4 | 3.0 | 6.0 |
| 980 nm | 5.3 | 4.2 | 4.2 |
| Maximum attenuation increase at 630 nm after temperature humidity cycling per FOTP-72 (dB/100 meters) | 0.5 | 0.4 | 4.2 |
| Maximum attenuation increase at 630 nm after thermal cycling −65° C. to +125° C. (dB/100 meters) | 1.0 | 0.6 | 3.4 |

*Comparative sample

Figure 4:
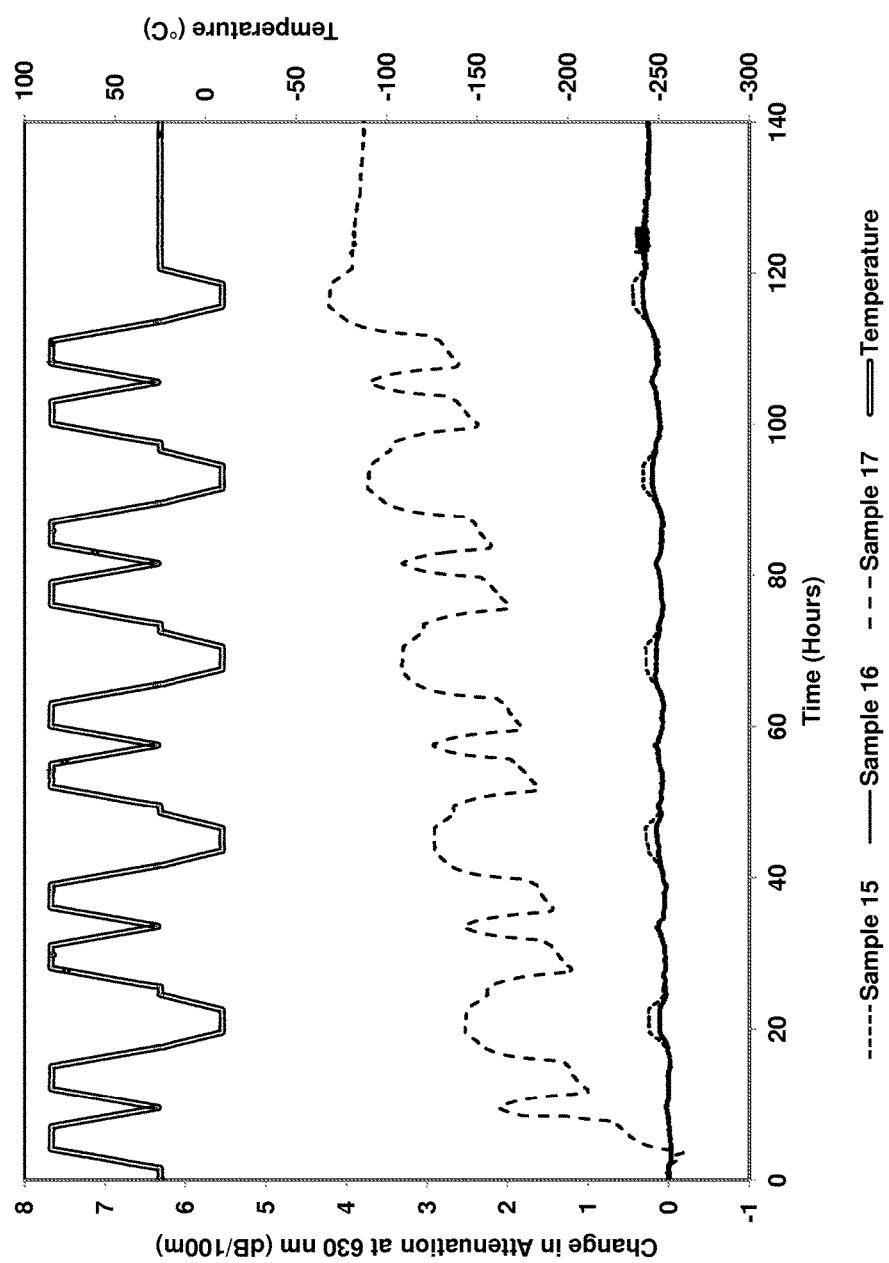
FIG. 4 is a graph showing the change in attenuation versus time for 100-m fiber coils when subjected to temperature and humidity cycling per FOTP-72 and measured at a wavelength of 630 nanometers.
Figure 5:
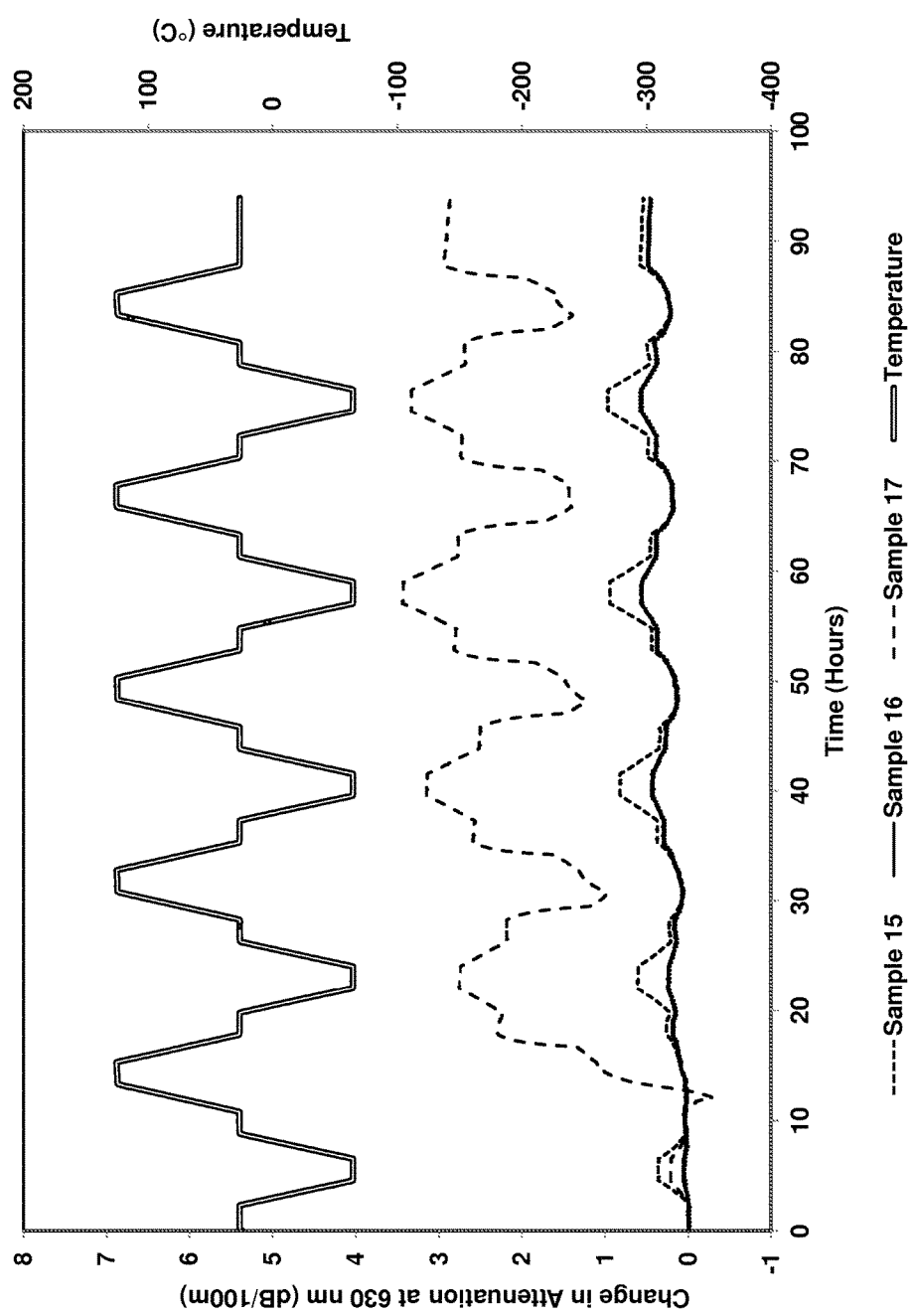
FIG. 5 is a graph showing the change in attenuation versus time for 100-m fiber coils when subjected to thermal cycling at −65 to 125° C. and measured at a wavelength of 630 nanometers.
Figure 6:
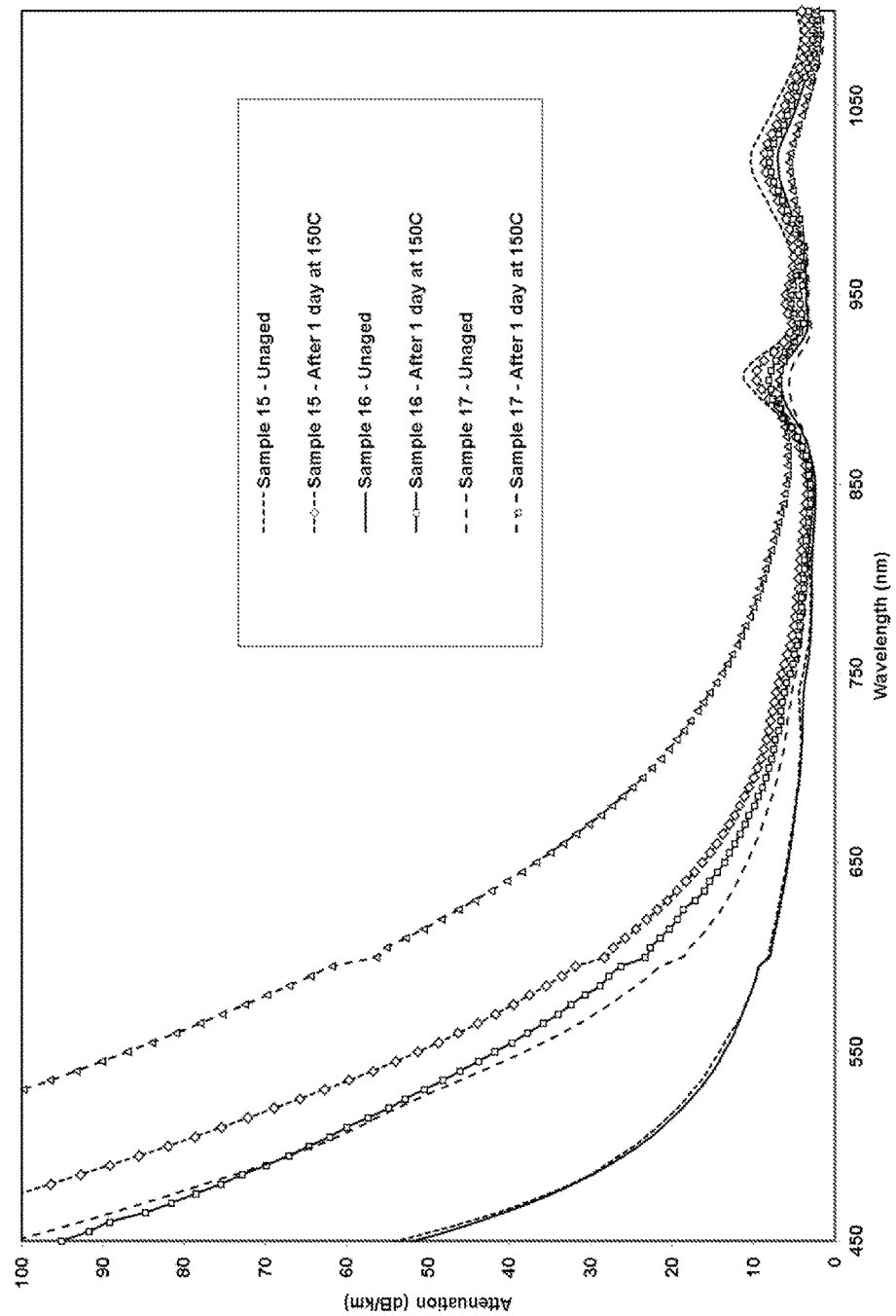
FIG. 6 is a graph showing the attenuation versus wavelength for loose 100-m coils before and after aging 1 day at 150° C.

Loose 100-meter (100-m) coils of each fiber were subjected to three different severe environmental exposures. One set was exposed to temperature/humidity cycling per FOTP-72, while monitoring attenuation at the visible wavelength of 630 nm (See FIG. 4). A second set was thermally cycled from −65° C. to +125° C., again monitoring at 630 nm (See FIG. 5). A third set was subjected to thermal aging for 1 day at 150° C., with measurement of spectral attenuation before and after the exposure (See FIG. 6). FIG. 4 is a graph showing the change in attenuation versus time when subjected to temperature and humidity cycling of the loose 100-m coils per FOTP-72 when measured at 630 nanometers. FIG. 5 is a graph showing the change in attenuation versus time when subjected to thermal cycling of the loose 100-m coils at −65 to 125° C. when measured at 630 nanometers. FIG. 6 is graph showing the attenuation versus wavelength for the loose 100-m coils before and after aging 1 day at 150° C.

Sample 16 displayed superior environmental stability during these tests (See Table 6); this fiber utilized polymer cladding having an 80:20 weight ratio of F20 fluorinated monoacrylate to OFHDDA fluorinated diacrylate monomers, where the weight ratio is based on the sum of weights of the F20 fluorinated monoacrylate to OFHDDA fluorinated diacrylate monomers only.

From Table 6 it may be seen that the fibers having the crosslinked composition display a maximum attenuation increase of 0.4 to 4.2 decibels per 100 meters at 630 nm after temperature humidity cycling when measured as per FOTP-72. From the Table 6 it may also be seen that the fibers display a maximum attenuation increase of 0.6 to 3.4 decibel per 100 meters at 630 nm after thermal cycling of −65° C. to +125° C.

Example 4

This is another example that was conducted to demonstrate the properties of fibers that were coated (cladded) with the disclosed crosslinked composition comprising fluorinated monofunctional monomers (monoenes) and fluorinated di-functional monomers and further having disposed upon the cladding a buffer comprising ETFE.

Table 7 below discloses a fiber that was manufactured using the disclosed composition as well as a fiber that was manufactured using a comparative composition. The comparative composition is disclosed as Sample 1-A' from Table 4 while the disclosed composition is detailed as being similar to Sample 11 of Table 3. The nominal fiber diameters are 200/230/500 μm/μm/μm (glass/cladding/ETFE buffer outer diameters respectively) using a Heraeus F300 pure silica preform. The collected fiber lengths were in the range 1-2.2 kilometers (km). Both fiber lots exhibited low optical attenuation as-drawn, in the range 3.1-3.3 dB/km at a wavelength of 850 nm. Numerical apertures were measured at 633 nm to be 0.48 and 0.44 for the new and prior-art claddings, respectively. Fibers were subjected to the three types of environmental exposure described above, with results summarized in Table 7 below.

TABLE 7

| Composition | Sample 18* | Sample 19 |
| --- | --- | --- |
| Description | Similar to comparative cladding 1-A' in Table 4 | Similar to Sample 11 in Table 3 |
| F20 Acrylate | 84.2 | |
| Non-fluorinated crosslinker monomers | 13.8 | |
| DDFHPA | | 80 |
| DDFODDA | | 20 |
| Irgacure 1173 | 1 | 1.6 |
| Acryloxypropyl trimethoxy silane | 1 | 1.6 |
| Expected Shore D hardness | <70 | ~69 |
| Measured fiber NA @ 633 nm | 0.443 | 0.480 |
| Attenuation, 100-gm tension, as-drawn (dB/km) | | |
| 630 nm | 7.4 | 12.4 |
| 850 nm | 3.1 | 3.3 |
| 980 nm | 5.8 | 4.6 |
| Attenuation, 100-m loose coils after 24 hr @ 150 C. (dB/km) | | |
| 630 nm | 19.9 | 39.3 |
| 850 nm | 3.6 | 4.8 |
| 980 nm | 6.4 | 4.5 |
| Maximum attenuation increase at 630 nm after temperature humidity cycling per FOTP-72 (dB/(100-m)) | 0.3 | 1.7 |
| Maximum attenuation increase at 630 nm after thermal cycling −65° C. to +125° C. (dB/(100-m)) | 1.0 | 3.4 |

*Comparative Sample

Example 5

This example was conducted to demonstrate bend strength while a high-power laser light is launched into the core of the fiber. Fibers were drawn with three different polymer claddings using a FLUOSIL® glass preform having a pure silica core and a fluorosilicate glass inner cladding. Nominal geometries (in microns) were 272/299/330/400 for the glass core, glass cladding, polymer cladding, and an ETFE buffer, respectively. The polymer claddings had corresponding nominal NA values of 0.37, 0.43, and 0.47 as calculated with respect to a silica core. However, the true NA of the fiber in this case was determined predominantly by its glass cladding. The results are shown in Table 8 and FIG. 7.

TABLE 8

| Cladding type | Nominal cladding NA, relative to pure silica core | Bend radius at 50% failure probability (mm) |
| --- | --- | --- |
| 1-A | 0.37 | ~17 |
| 1-A' | 0.43 | ~12 |
| Same recipe as Samples 13 and 16 | 0.47 | ~9 |

The fibers were subjected to two-point bending while transmitting laser power using a methodology previously published, which is detailed in Xiaoguang Sun; Jie Li; Adam Hokansson; Study of optical fiber damage under tight bend with high optical power at 2140 nm. Proc. SPIE 6433, Optical Fibers and Sensors for Medical Diagnostics and Treatment Applications VII, 643309, Feb. 15, 2007. The laser used in the fiber testing was a pulsed Nd:YAG laser from Lee Laser. The center wavelength of the laser was located at 1064 nm and the pulse repetition rate was set at 6 kHz. The apparatus measured fiber breaking diameter while transmitting power, with parallel plates moving together so as to bend the fiber at a constant jaw speed of 2 mm/s. Average power was 83 W, with a peak power of 170 kW.

Figure 7:
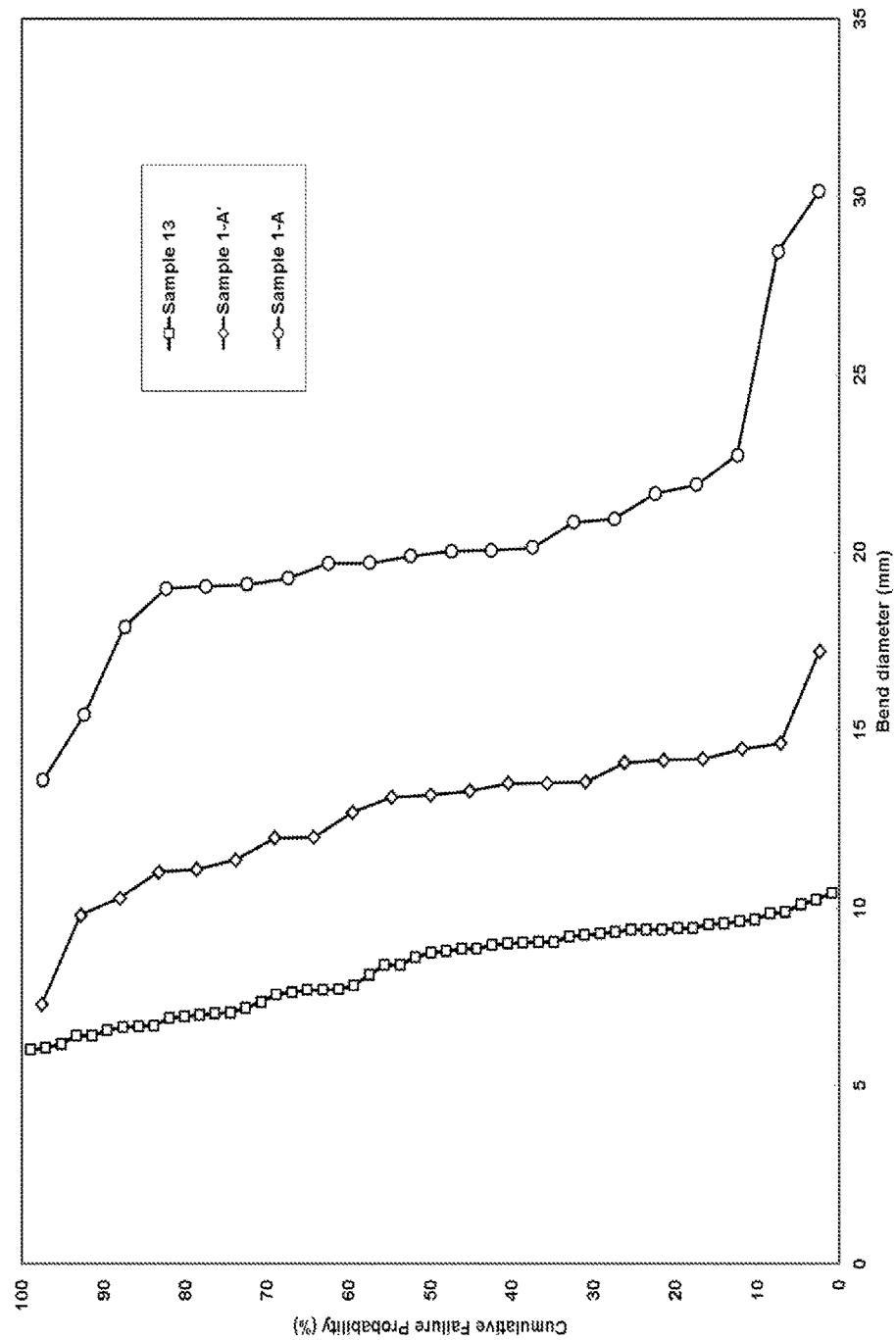
FIG. 7 is a graph showing fiber failure as a function of bend radius while transmitting high-power laser radiation. Smaller bend radius at break is an indication of higher strength.

The failure probability was determined as a function of bend radius (See FIG. 7). FIG. 7 is a graph showing failure as a function of bend radius. Smaller bend radius at break is an indication of higher strength. The higher NA (lower refractive index) cladding of this disclosure enables bending to a smaller radius than the comparative claddings, demonstrating superior strength and mechanical resistance to laser power during bending.

Example 6

Figure 8:
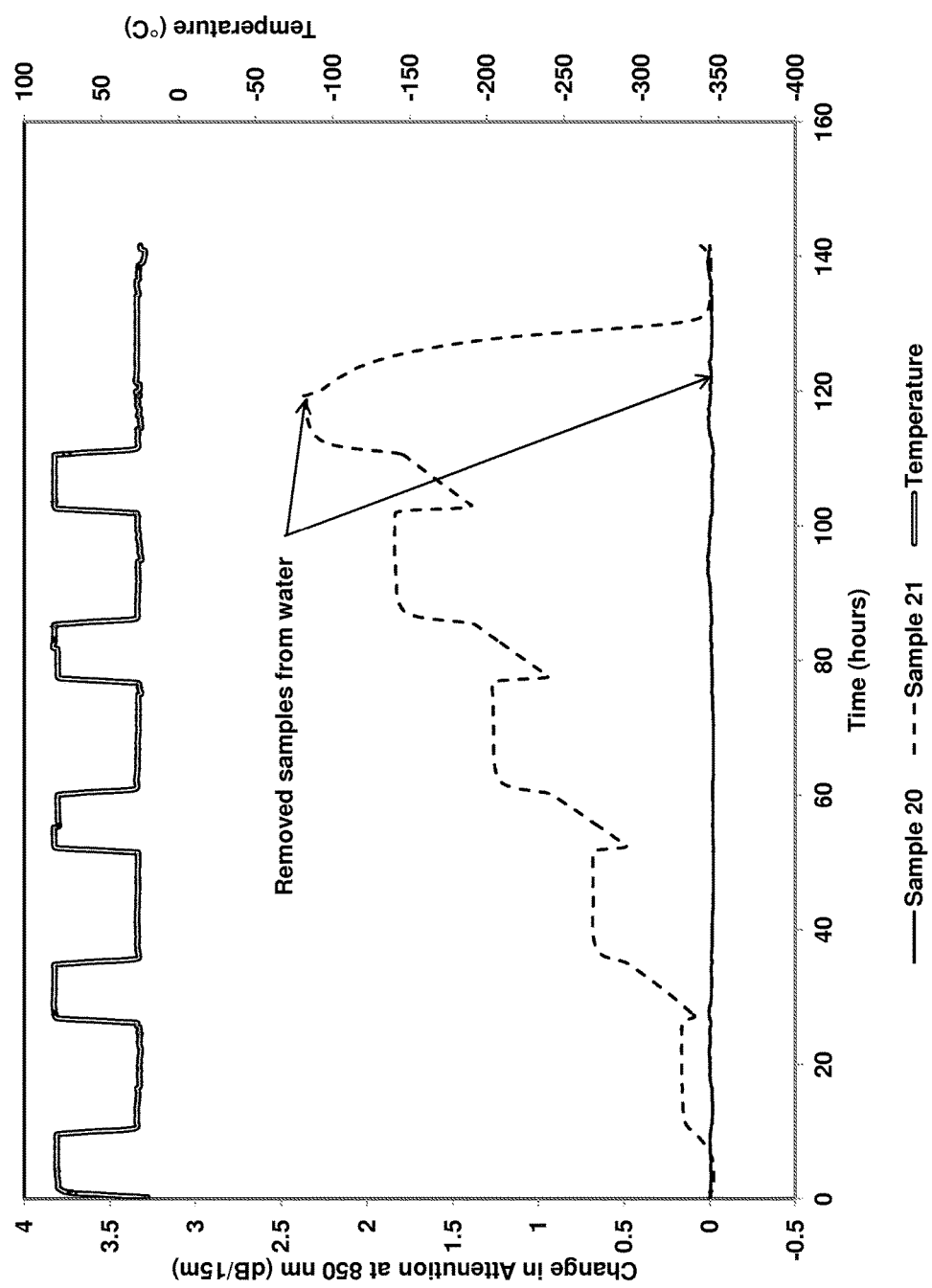
FIG. 8 is a graph that compares the change in attenuation performance at 850 nm during hot water soaking of fiber having the inventive cladding with that of a comparative commercially available fiber. The fiber coils are 15 meters in length.

This example compares the performance during hot water soaking of fiber having the inventive cladding with that of a comparative commercially available fiber. Sample 20 having the disclosed composition was produced using the same cladding composition and manufacturing recipe as Sample 16 (See Table 6). A comparative fiber Sample 21 was produced having cladding 1-A (See Table 4). Both had nominal geometries of 200/230/500 glass/cladding/ETFE where the dimensions are in microns. Both were subjected to soaking in water while the temperature was cycled up to 80° C. and the attenuation was monitored at a wavelength of 850 nm. The results are displayed in the FIG. 8. The attenuation of Sample 20 remained quite stable during the exposure, while that of Sample 21 climbed during the test. Sample 20 showed an attenuation change of less than 0.05 dB/(15 meter) in this test.

Example 7

This example compares the performance balance of the inventive fibers with those from fibers made using a series of commercial polymer claddings. Certain commercial claddings were selected from among those detailed in Table 4 and were used to draw optical fibers having 200 micron glass diameter. In some cases, the fibers were drawn using Heraeus F300 Low OH glass, while other fibers were drawn using Heraeus Spectrasil F2000 High OH glass. The commercial claddings all had "high" viscosities greater than 1000 centipoise at room temperature. Certain fibers were drawn with single coating layers and without a secondary buffer, in cases where the polymer cladding elastic modulus at 23° C. was greater than about 50 MPa. Other fibers were drawn using UV-curable urethane acrylate secondary coatings as outer buffer layers. These buffers were representative of types commonly used in telecommunications fibers and are designated as UrAcr1 and UrAcr2 in Table 9. The fibers were tested using three types of environmental exposures in the same manner as the inventive fiber samples disclosed in Examples 3 and 4. In a first type of exposure, 100-m loose fiber coils were aged for 1 day at 150° C. and the attenuation was measured before and after the aging at a wavelength of 630 nm, using a spectral bench and the well-known cutback method. The results are summarized in Table 9, where attenuation at 630 nm is tabulated for un-aged and aged fibers. In a second type of exposure, 100-m loose fiber coils were subjected to temperature and humidity cycling per FOTP-72 at temperatures in the range −10° C. to +85° C. and relative humidity values up to 85%, as in FIG. 4. In a third type of exposure, 100-m loose fiber coils were subjected to thermal cycling from −65° C. to +125° C. at ambient humidity, as in the FIG. 5. For the temperature-humidity cycling and the thermal cycling, the optical transmission was measured at 630 nm during the exposures, and the maximum change in attenuation for each fiber is tabulated in Table 9.

The inventive claddings provided a superior performance balance in comparison with each of the commercial claddings. The inventive claddings provided optical transmission for un-aged fibers of less than 15 dB/km at 630 nm, with Samples 16, 19, and 20 providing less than 10 dB/km before aging. The inventive claddings provided optical transmission of less than 45 dB/km at 630 nm after aging 1 day at 150° C., with Samples 16, 19, and 20 providing preferred values of less than 20 dB/km after the aging. Commercial claddings 4-N and 2-E provided particularly high and extremely undesirable attenuation even before aging (64.9 and 77.9 dB/km, respectively). Other commercial claddings resulted in undesirably high attenuation values of greater than 50 dB/km at 630 nm after aging 1 day at 150° C.; these included cladding 2-C when applied as a monolayer coating, and claddings 4-N, 1-B, and 2-D when applied together with UV-curable buffers. When exposed to either the temperature-humidity cycling or the thermocycling, the disclosed claddings produced less than 4.5 dB/(100-m) increase in attenuation at 630 nm, with samples 16 and 20 providing particularly preferred values of less than 1 dB/(100-m) increase. In contrast, commercial claddings 3-G, 4-J, 4-N and 4-J displayed attenuation increases of greater than 10 dB/(100-m) and up to about 48 dB/(100-m) during temperature-humidity cycling and similar undesirable increases upon thermocycling. Cladding 1-B displayed variable performance, sometimes producing relatively good, low attenuation as a result of environmental exposures and other times producing particularly poor, high attenuation.

Without wishing to be bound by theory, the increases in attenuation for the various fibers when subjected to these three different types of environmental exposures are believed to result from one or more mechanisms such as chemical degradation that produces yellowing, phase separation of uncrosslinked constituents resulting in light scattering, micro-bending due to shrinkage of buffer layers atop softer polymer claddings, micro-bending and optical absorption resulting from swelling due to water absorption, or increases in refractive index due to migration of mobile uncrosslinked constituents or adsorbed moisture through the coating to the glass/coating interface. Additionally, data suggests that poor performance in most cases is associated with claddings having relatively lower elastic modulus and/or with claddings that do not contain a silane adhesion promoter. In the case of commercial claddings 5-P and 5-Q, relatively good optical transmission was observed for un-aged fibers as well as during and after the three types of environmental exposures. However, claddings 5-P and 5-Q showed poor fingernail scratch resistance in comparison with the disclosed inventive claddings. Lastly, claddings 3-F, 3-G, 3-H, and 3-I are unsatisfactory because they utilize components that are restricted due to their similarity to PFOA.

This example demonstrates that inventive claddings provided optical transmission of less than 45 dB/km at 630 nm, preferably less than 35 dB/km at 630 nm, preferably less than 35 dB/km at 630 nm and preferably less than 20 dB/km at 630 nm after aging 1 day at 150° C.

From the aforementioned examples, it may be seen that the crosslinked composition produces fibers having a unique combination of properties. The fibers display a numerical aperture greater then 0.46, preferably greater than 0.47, and more preferably greater than 0.475. The fibers can display a numerical aperture of up to 0.50 when disposed upon a silica optical fiber. The fibers also display superior capability for tight bending under high laser power.

The fibers also display an attenuation (in their as-drawn condition, when spooled with 100-gm of tension) of 5.5 to 12 decibels per kilometer when measured at a wavelength of 630 nanometers and display an attenuation after 24 hours exposure to a temperature of 150° C. of 17 to 45 decibels per kilometer when measured at a wavelength of 630 nanometers.

TABLE 9

| Fiber Sample | Glass Type | Polymer Cladding Type | Buffer Type | Nominal Diameter (microns) Polymer Cladding | Nominal Diameter (microns) Buffer | Proof Test Level During Draw (kpsi) | Numerical Aperture, 630 nm, measured on fiber | Attenuation at 630 nm wavelength, loose 100-m coils Un-aged (dB/km) | Attenuation at 630 nm wavelength, loose 100-m coils After 1 day at 150° C. (dB/km) | Maximum Increase During T/RH Cycling (dB/(100-m)) | Maximum Increase During Thermocycling (dB/(100-m)) |
|---|---|---|---|---|---|---|---|---|---|---|---|
| 22 | High OH | 3-I | — | 300 | — | 0 | 0.477 | 11.4 | 22.0 | 4.1 | 1.0 |
| 23 | | 1-B | — | 300 | — | 0 | 0.471 | 8.2 | 16.4 | 2.1 | 1.0 |
| 24 | | 3-G | — | 300 | — | 0 | 0.508 | 12.5 | 28.4 | 18.0 | 1.9 |
| 25 | | 2-C | — | 300 | — | 0 | 0.467 | 19.1 | 51.0 | 4.1 | 1.7 |
| 26 | | 1-A' | ETFE | 230 | 500 | 150 | 0.433 | 6.8 | 25.4 | 0.4 | 0.7 |
| 27 | Low OH | 4-N | UrAcr1 | 230 | 300 | 100 | 0.391 | 64.9 | 104.1 | 11.7 | 6.2 |
| 28 | | 1-B | UrAcr1 | 230 | 300 | 0 | 0.468 | 11.6 | 65.1 | 3.0 | 4.1 |
| 29 | | 2-D | UrAcr1 | 230 | 300 | 0 | 0.498 | 19.4 | 70.7 | 4.0 | 13.3 |
| 30 | | 4-J | UrAcr1 | 230 | 300 | 0 | 0.410 | 10.7 | Too lossy | 48.3 | 44.6 |

TABLE 9-continued

| | | Polymer | | Nominal Diameter (microns) | | Proof Test Level During Draw (kpsi) | Numerical Aperture, 630 nm, measured on fiber | Attenuation at 630 nm, loose 100-m coils | | | |
|---|---|---|---|---|---|---|---|---|---|---|---|
| Fiber Sample | Glass Type | Cladding Type | Buffer Type | Polymer Cladding | Buffer | | | Un-aged (dB/km) | After 1 day at 150° C. (dB/km) | Maximum Increase During T/RH Cycling (dB/(100-m)) | Maximum Increase During Thermocycling (dB/(100-m)) |
| 31 | | 4-O | UrAcr1 | 230 | 300 | 0 | 0.463 | 15.7 | Too lossy | 43.6 | 44.6 |
| 15 | | As in Table 6 | ETFE | 230 | 500 | 150 | 0.439 | 7.8 | 20.6 | 0.5 | 1.0 |
| 16 | | As in Table 6 | ETFE | 230 | 500 | 150 | 0.468 | 6.9 | 17.2 | 0.4 | 0.6 |
| 17 | | As in Table 6 | ETFE | 230 | 500 | 150 | 0.470 | 14.4 | 44.2 | 4.2 | 3.4 |
| 18 | | As in Table 7 | ETFE | 230 | 500 | 150 | 0.443 | 6.8 | 19.9 | 0.3 | 1.0 |
| 19 | | As in Table 7 | ETFE | 230 | 500 | 0 | 0.480 | 9.6 | 39.3 | 1.7 | 3.4 |
| 32 | | 2-E | UrAcr2 | 250 | 350 | 100 | 0.399 | 77.7 | — | — | — |
| 33 | | 5-Q | — | 300 | — | 0 | 0.493 | 7.7 | 29.4 | 0.5 | 2.3 |
| 34 | | 5-P | — | 300 | — | 0 | 0.498 | 7.3 | 16.8 | 0.3 | 0.8 |
| 35 | | 1-B | — | 300 | — | 100 | 0.478 | 7.5 | 19.1 | 29.1 | 1.2 |
| 36 | | 1-A' | ETFE | 230 | 500 | 150 | 0.442 | 7.3 | 24.7 | 2.3 | 0.7 |
| 20 | | Like sample 16 | ETFE | 230 | 500 | 150 | 0.475 | 7.3 | 13.4 | 0.5 | 0.4 |

It is to be noted that all ranges detailed herein include the endpoints. Numerical values from different ranges are combinable.

The transition term "comprising" encompasses the transition terms "consisting of" and "consisting essentially of".

The term "and/or" includes both "and" as well as "or". For example, "A and/or B" is interpreted to be A, B, or A and B.

The term (meth)acrylate encompasses both methacrylates and acrylates.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A composition comprising:
   65 to 95 weight percent of a fluorinated monofunctional monomer; where the fluorinated monofunctional monomer comprises a monofunctional reactive group that includes an ethylenically unsaturated functionality, an acrylate functionality, a methacrylate functionality, an epoxide functionality or a vinyl ether functionality;
   5 to 35 weight percent of a fluorinated multifunctional monomer; and
   0.5 to 3 weight percent of a silane coupling agent; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or CF moieties; and where a crosslinked composition has a shore D hardness of 56 to 85 and has a refractive index (RI) that meets the limitation of the equation:
   RI≤1.368+10.8/X, where X denotes wavelength in nanometers and ranges from 400 to 2100 nanometers.

2. The composition of claim 1, further comprising an initiator.

3. The composition of claim 1, where the fluorinated monofunctional monomer is a linear fluorinated monofunctional monomer represented by the chemical formula (2A)

$$R_1-(CF_2)_n-(CH_2)_m-R_2 \qquad (2A),$$

where $R_1$ is a non-reactive end group that includes $CH_2F$ or $CHF_2$ but not $CF_3$ when n is greater than or equal to 6 and where $R_1$ includes $CH_2F$, $CHF_2$ and $CF_3$ when n is less than 6; where $R_2$ is the monofunctional reactive group; where n is 1 to 15 and where m is 1 to 10.

4. The composition of claim 3, where $R_2$ comprises an acrylate functionality or a methacrylate functionality.

5. The composition of claim 1, where the fluorinated monofunctional monomer is 1,1-dihydroperfluorocyclohexane carbinol acrylate, 1,1-dihydroperfluorocyclohexane carbinol methacrylate, 1,1-dihydroperfluorocyclopentane carbinol acrylate, 1,1-dihydroperfluorocyclopentane carbinol methacrylate, 1H,1H,5H-octafluoro-pentyl acrylate, 1H,1H,11H-perfluoroundecyl acrylate, 1H,1H,9H-hexadecafluorononyl methacrylate, 1H,1H,7H-dodecafluoroheptyl acrylate, 2-(perfluorohexyl)ethyl acrylate, 2-(perfluorohexyl)ethyl methacrylate, 2-propenioic acid,3,3,4,4,5,6,6,6-octafluoro-5-(trifluoromethyl)hexyl ester, 1H,1H-perfluoro(2-methyl-3-oxaoctyl) acrylate, 1H,1H,2H,2H,3H,3H,4H,4H-perfluorodecyl acrylate, 2,2,3,3,4,4,5,5-octafluoropentyl acrylate, or a combination comprising at least one of the foregoing fluorinated monofunctional monomers.

6. The composition of claim 1, where the fluorinated monofunctional monomer is 1H,1H,11H-perfluoroundecyl acrylate.

7. The composition of claim 1, where the fluorinated monofunctional monomer is a cyclic fluorinated monofunctional monomer as represented by the chemical formula (2B) or (2C)

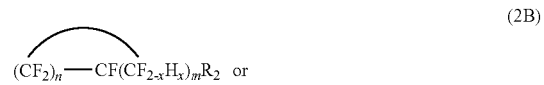

$$(CF_2)_n-CF(CF_{2-x}H_x)_mR_2 \text{ or} \qquad (2B)$$

-continued

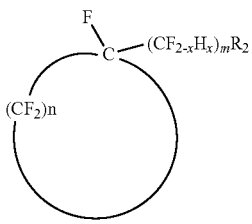
(2C)

where in the formulas (2B) and (2C), $R_2$ comprises the monofunctional reactive group, where n is 1 to 15, where m is 1 to 10, and where x is 0 to 2.

8. The composition of claim 7, where the fluorinated monofunctional monomer is perfluorocyclohexylmethylacrylate, perfluorocyclohexylmethyl methacrylate, or a combination thereof.

9. The composition of claim 1, where the fluorinated monofunctional monomer is a branched monofunctional monomer having the formula (4)

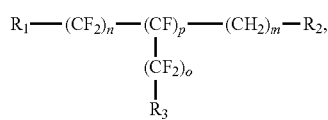

where $R_1$ and $R_3$ are non-reactive end groups that include $CH_2F$ or $CHF_2$ but not $CF_3$ when the sum of n and o is 6 or greater or where $R_1$ and $R_3$ include $CH_2F$, $CHF_2$ or $CF_3$ when the sum of n and o is less than 6, where $R_2$ is the monofunctional reactive group; where n and o are 1 to 15, where p is 1 to 6 and where m is 1 to 10.

10. The composition of claim 1, where the fluorinated multifunctional monomer has the structure shown by the formulas (5) through (8)

(5)
(6)
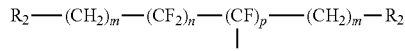
(7)

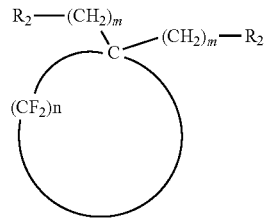
(8)

where $R_2$ is a reactive group that includes an ethylenically unsaturated functionality, an acrylate functionality, methacrylate functionality, an epoxide functionality or a vinyl ether functionality, where n is 1 to 15, m is 1 to 10, and p and o are each independently 1 to 10.

11. The composition of claim 1, where the multifunctional monomer is 2,2,3,3,4,4,5,5-octafluoro-1,6-hexanediol diacrylate, 2,2,3,3,4,4,5,5,6,6,7,7-dodecafluoro-1,8-octanediol diacrylate, or a combination thereof.

12. The composition of claim 1, where the silane coupling agent is γ-methacryloxypropyltrimethoxysilane, γ-acryloxypropyltrimethoxysilane, γ-methacryloxypropyltris(β-methoxyethoxy)silane, γ-acryloxypropyltris(β-methoxyethoxy)silane, γ-mercaptopropyltrimethoxysilane, γ-mercaptopropyltriethoxysilane, γ-glycidoxypropyltrimethoxysilane, γ-glycidoxypropylmethyldiethoxysilane, β(3,4-epoxycyclohexyl)ethyltrimethoxysilane, or a combination comprising at least one of the foregoing silane coupling agents.

13. A composition comprising the reaction product of claim 1.

14. An article comprising the composition of claim 1.

15. An article comprising the composition of claim 13.

16. The article of claim 15, where the article displays a numerical aperture greater than 0.45, an attenuation in the as-drawn condition under 100-gm of tension of 5.5 to 12 decibels per kilometer when measured at a wavelength of 630 nanometers and displays an attenuation after 24 hours exposure to a temperature of 150° C. of 17 to 45 decibels per kilometer when measured at a wavelength of 630 nanometers.

17. A method comprising:
blending together 65 to 95 weight percent of a fluorinated monofunctional monomer; 5 to 35 weight percent of a fluorinated multifunctional monomer; where the fluorinated monofunctional monomer comprises a monofunctional reactive group that includes an ethylenically unsaturated functionality, an acrylate functionality, a methacrylate functionality, an epoxide functionality or a vinyl ether functionality; 0.5 to 3 weight percent of a silane coupling agent to form a composition; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or $CF$ moieties; and where a crosslinked composition has a shore D hardness of 56 to 85 and has a refractive index (RI) that meets the limitation of the equation:
RI≤1.368+10.8/X, where X denotes wavelength in nanometers and ranges from 400 to 2100 nanometers.

18. The method of claim 17, further comprising disposing the composition on an optical fiber.

19. The method of claim 18, further comprising subjecting the composition to radiation to form a cladding.

20. The method of claim 19, where the radiation is ultraviolet radiation.

21. The method of claim 20, further comprising disposing upon the cladding a buffer layer.

22. The method of claim 17, where the composition further comprises a photoinitiator.

23. An article comprising:
an optical fiber;
a cladding comprising the reaction product of a composition comprising:
65 to 95 weight percent of a fluorinated monofunctional monomer;
5 to 35 weight percent of a fluorinated multifunctional monomer; and
0.5 to 3 weight percent of a silane coupling agent; where all weight percents are based on the total weight of the composition; where the fluorinated monofunctional monomer and the fluorinated multifunctional monomer are devoid of any trifunctional fluorocarbon moieties when they have 6 or more fluorocarbon repeat units; where the fluorocarbon repeat units are $CF_2$ or $CF$ moieties; and where a crosslinked composition has a shore D hardness of 56 to 85 and has a refractive index (RI) that meets the limitation of the equation: $RI \leq 1.368 + 10.8/X$, where X denotes wavelength in nanometers and ranges from 400 to 2100 nanometers; where the cladding contacts the optical fiber; and a buffer layer disposed upon the cladding.

* * * * *